US012627189B2

(12) United States Patent
Nishikawa et al.

(10) Patent No.: US 12,627,189 B2
(45) Date of Patent: May 12, 2026

(54) STATOR, ROTATING ELECTRIC MACHINE, AND METHOD OF MANUFACTURING STATOR

(71) Applicant: SUMITOMO BAKELITE CO., LTD., Tokyo (JP)

(72) Inventors: Atsunori Nishikawa, Tokyo (JP); Takahiro Harada, Tokyo (JP); Shinya Yamamoto, Tokyo (JP); Wataru Kosaka, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 188 days.

(21) Appl. No.: 18/039,046

(22) PCT Filed: Dec. 8, 2021

(86) PCT No.: PCT/JP2021/045072
§ 371 (c)(1),
(2) Date: May 26, 2023

(87) PCT Pub. No.: WO2022/124329
PCT Pub. Date: Jun. 16, 2022

(65) Prior Publication Data
US 2024/0006947 A1     Jan. 4, 2024

(30) Foreign Application Priority Data

Dec. 9, 2020   (JP) ................................. 2020-203912
Apr. 9, 2021   (JP) ................................. 2021-066387

(51) Int. Cl.
*H02K 3/34*      (2006.01)
*H02K 3/30*      (2006.01)
(Continued)

(52) U.S. Cl.
CPC .............. *H02K 3/345* (2013.01); *H02K 3/30* (2013.01); *H02K 15/10* (2013.01); *H02K 15/12* (2013.01); *H02K 21/14* (2013.01)

(58) Field of Classification Search
CPC .................................. H02K 3/12; H02K 3/28
See application file for complete search history.

(56) References Cited

U.S. PATENT DOCUMENTS 6,873,082 B2 *   3/2005   Neet ...................... H02K 1/165
                                                     310/216.023
7,042,129 B2     5/2006   Neet
(Continued)

FOREIGN PATENT DOCUMENTS

JP      2003-158842 A      5/2003
JP      2003-284277 A     10/2003
(Continued)

OTHER PUBLICATIONS

JP-2017163797-A machine translation Jan. 25, 2025.*
(Continued)

*Primary Examiner* — Leda T Pham
(74) *Attorney, Agent, or Firm* — Birch, Stewart, Kolasch & Birch, LLP

(57) ABSTRACT

A stator (4) has a stator core having a plurality of tooth portions (7), a slot (8) provided between the tooth portions (7) and accommodating a coil (9), and the coil (9) accommodated in the slot (8), the stator has a resin layer (50) provided on an inner surface of the slot (8) and made of an insulating resin composition, a wall surface (a resin layer surface (55) of an inner resin layer (51)) of the resin layer (50) on an inner side of the slot (8) is provided in parallel with a rotating shaft direction, the resin composition of the
(Continued)

resin layer (50) contains a thermosetting resin, and the thermosetting resin has a glass transition temperature Tg of 120° C. or higher.

10 Claims, 13 Drawing Sheets

(51) Int. Cl.
  *H02K 15/10* (2006.01)
  *H02K 15/12* (2006.01)
  *H02K 21/14* (2006.01)

(56) References Cited

U.S. PATENT DOCUMENTS

| | | | |
|---|---|---|---|
| 7,081,697 | B2 | 7/2006 | Neet |
| 7,649,298 | B2 | 1/2010 | Enomoto et al. |
| 8,212,449 | B2 | 7/2012 | Kouda |
| 9,590,460 | B2 | 3/2017 | Huang et al. |
| 10,971,975 | B2 | 4/2021 | Ronning |
| 11,316,410 | B2 | 4/2022 | Ronning |
| 2002/0130582 | A1 | 9/2002 | Oketani et al. |
| 2005/0280327 | A1 | 12/2005 | Neet |
| 2005/0280328 | A1 | 12/2005 | Neet |
| 2008/0018196 | A1 | 1/2008 | Enomoto et al. |
| 2009/0179506 | A1* | 7/2009 | Saga ..................... H02K 9/223 |
| | | | 310/215 |
| 2010/0244615 | A1* | 9/2010 | Kouda ..................... H02K 3/48 |
| | | | 310/215 |
| 2015/0035406 | A1 | 2/2015 | Huang et al. |
| 2018/0166951 | A1 | 6/2018 | Ronning |
| 2020/0126688 | A1* | 4/2020 | Ikeda ................... H01B 7/2813 |
| 2021/0194328 | A1 | 6/2021 | Ronning |

FOREIGN PATENT DOCUMENTS

| | | | | |
|---|---|---|---|---|
| JP | 2008-29142 | A | | 2/2008 |
| JP | 2008-503993 | A | | 2/2008 |
| JP | 2010-154731 | A | | 7/2010 |
| JP | 2010-259316 | A | | 11/2010 |
| JP | 2013127042 | A | * | 6/2013 |
| JP | 2015-33323 | A | | 2/2015 |
| JP | 2015-18828 | A | | 2/2016 |
| JP | 2017163797 | A | * | 9/2017 |
| JP | 2018-26930 | A | | 2/2018 |
| JP | 2018-44129 | A | | 3/2018 |
| JP | 2020-502974 | A | | 1/2020 |
| JP | 2020-94092 | A | | 6/2020 |
| JP | 2020094092 | A | * | 6/2020 |
| JP | 6814568 | B2 | | 1/2021 |
| WO | WO 2020/044892 | A1 | | 3/2020 |

OTHER PUBLICATIONS

JP-2020094092-A machine translation Jan. 25, 2025.*
JP-2013127042-A machine translation, Sep. 26, 2025.*
International Search Report (PCT/ISA/210) issued in PCT/JP2021/045072 mailed on Mar. 8, 2022.
Written Opinion (PCT/ISA/237) issued in PCT/JP2021/045072 mailed on Mar. 8, 2022.

* cited by examiner

FIG. 12
201
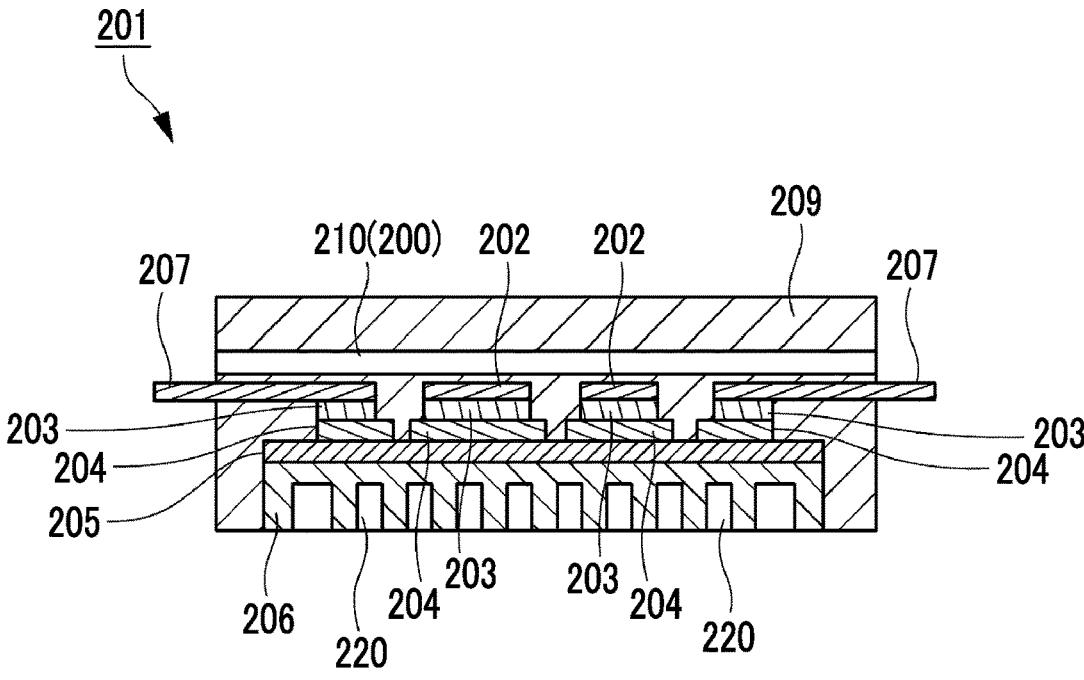
FIG. 13A
FIG. 13B
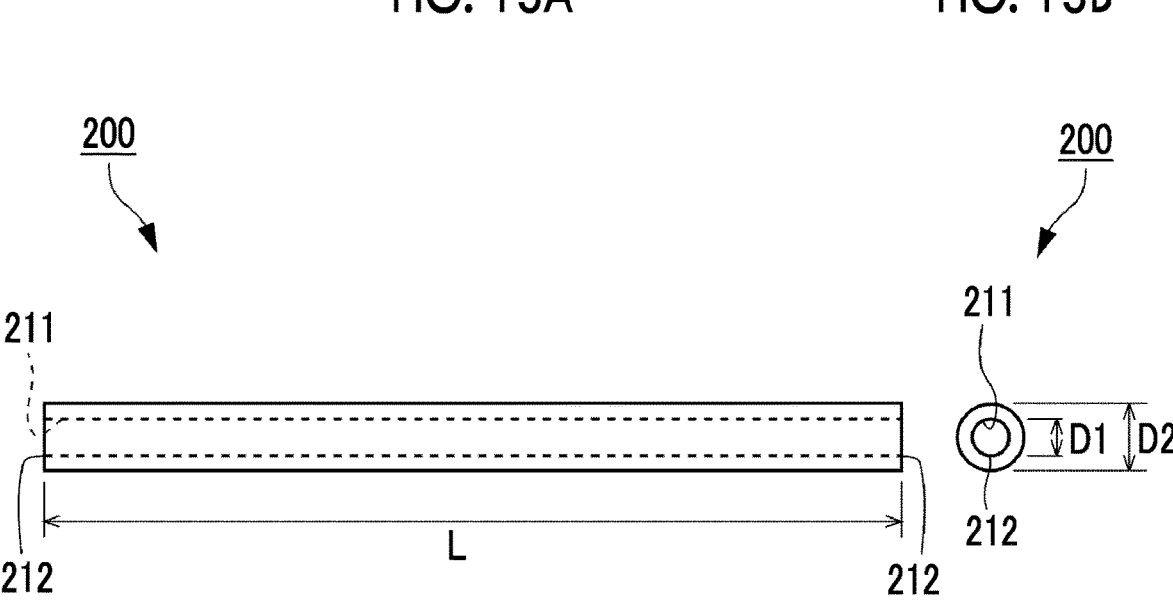

STATOR, ROTATING ELECTRIC MACHINE, AND METHOD OF MANUFACTURING STATOR

TECHNICAL FIELD

The present invention relates to a stator, a rotating electric machine, and a method of manufacturing the stator.

BACKGROUND ART

Regarding a rotating electric machine such as a motor (engine) or a generator, there has been known a technology for securing insulation between a slot and a coil by filling the slot with insulating paper or a resin material in a case where the coil is accommodated in the slot provided in a stator (for example, see Patent Document 1).

Patent Document 1 discloses a technology for forming an insulating layer by injecting and curing a resin between a conductor (coil) and a peripheral wall portion of a slot.

RELATED DOCUMENT

Patent Document

[Patent Document 1] Japanese Patent No. 6814568

SUMMARY OF THE INVENTION

Technical Problem

In improving the performance of a motor, there has been a requirement for a technology for: accurately placing a coil while properly maintaining insulation of the coil; and improving the space utilization efficiency of a slot, that is, increasing the ratio of the coil in the slot.

The present invention is contrived in view of such circumstances, and an object of the present invention is to provide a technology capable of improving the space utilization efficiency of a slot.

Solution to Problem

According to the present invention,
there is provided a stator having: a stator core having a plurality of tooth portions; a slot provided between the tooth portions and accommodating a coil; and the coil accommodated in the slot,
in which the stator has a resin layer provided on an inner surface of the slot and made of an insulating resin composition,
a wall surface of the resin layer on an inner side of the slot is provided in parallel with a rotating shaft direction,
the resin composition contains a thermosetting resin, and
the thermosetting resin has a glass transition temperature Tg of 120° C. or higher.

According to the present invention, there is provided a rotating electric machine having the above-described stator.

According to the present invention,
there is provided a method of manufacturing a stator used for a rotating electric machine, having a stator core having a plurality of tooth portions, a slot provided between the tooth portions and accommodating a coil, and the coil accommodated in the slot, having:
a resin layer forming step of forming a resin layer made of an insulating resin composition on an inner surface of the slot; and a coil placing step of placing the coil in the slot provided with the resin layer,
in which a wall surface of the resin layer on an inner side of the slot is provided in parallel with a rotating shaft direction of the rotating electric machine,
the resin composition contains a thermosetting resin, and
the thermosetting resin has a glass transition temperature Tg of 120° C. or higher.

Advantageous Effects of Invention

According to the present invention, it is possible to provide a technology capable of improving the space utilization efficiency of a slot.

BRIEF DESCRIPTION OF THE DRAWINGS

FIG. 12 is a schematic view of a power module according to a fourth embodiment.

FIGS. 13A and 13B are schematic views of a small-diameter resin pipe according to the fourth embodiment.

DESCRIPTION OF EMBODIMENTS

First Embodiment

<Outline>

Figure 1:
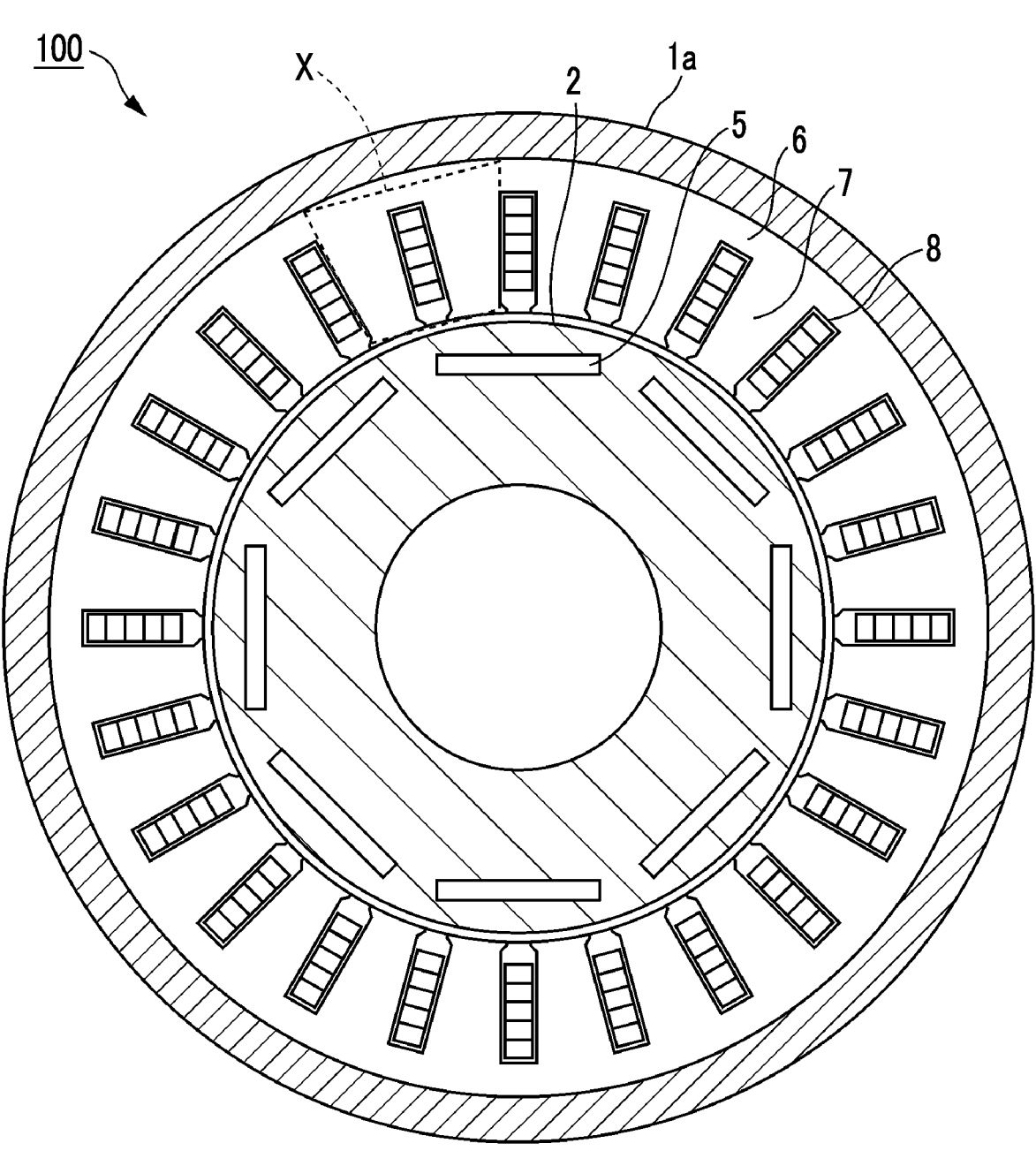
FIG. 1 is a cross-sectional view of a motor according to a first embodiment in a direction perpendicular to a rotating shaft direction.
Figure 2:
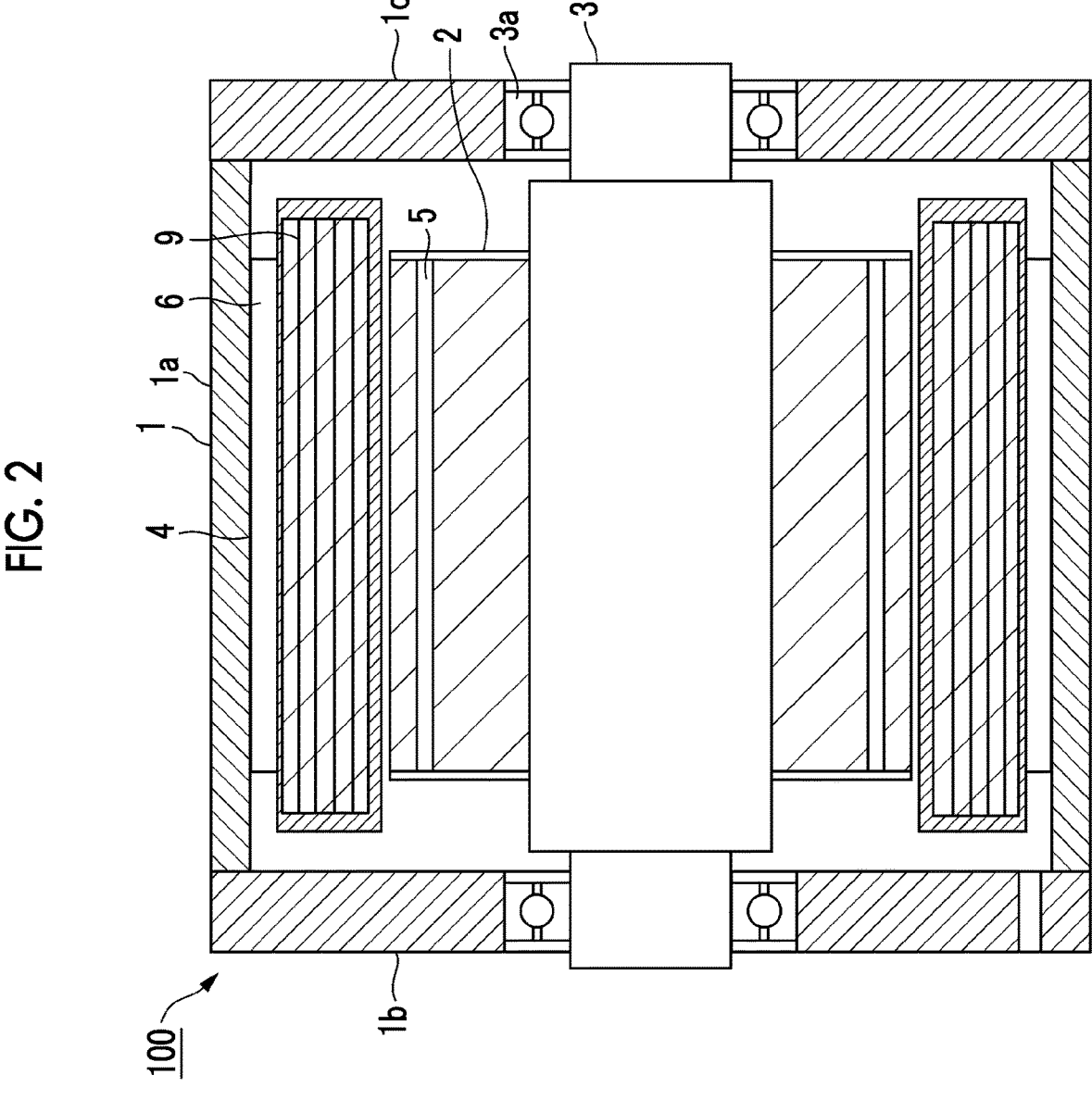
FIG. 2 is a vertical cross-sectional view of the motor according to the first embodiment in the rotating shaft direction.
Figure 3:
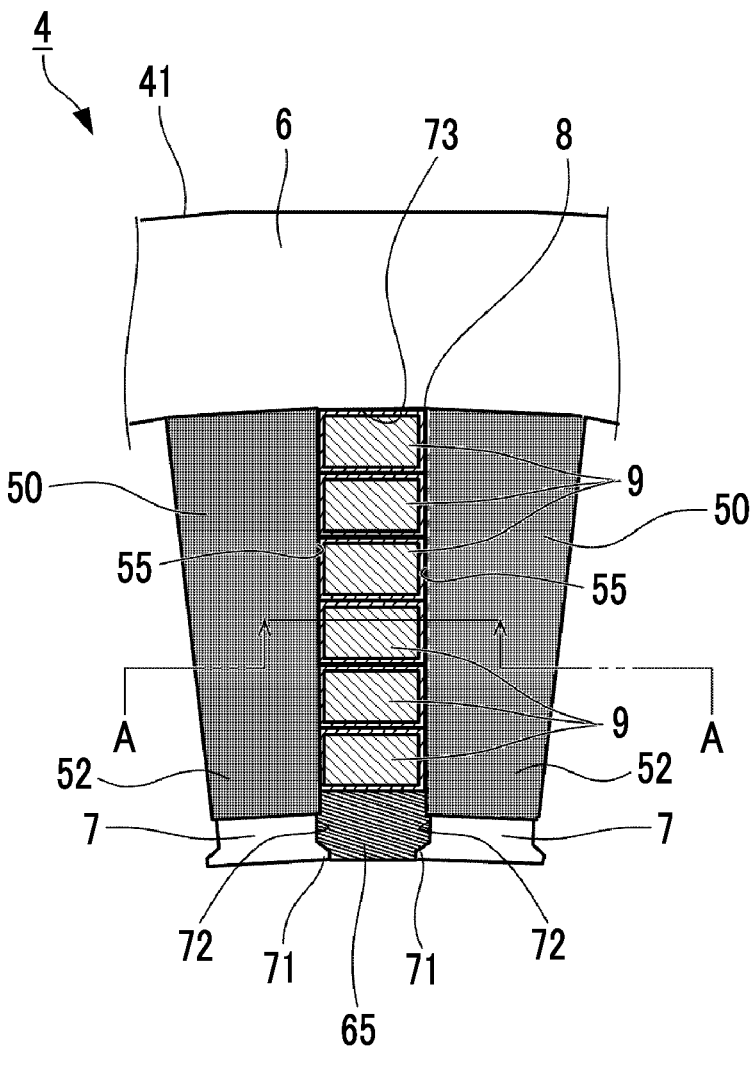
FIG. 3 is an enlarged view showing the periphery of a slot according to the first embodiment.
Figure 4:
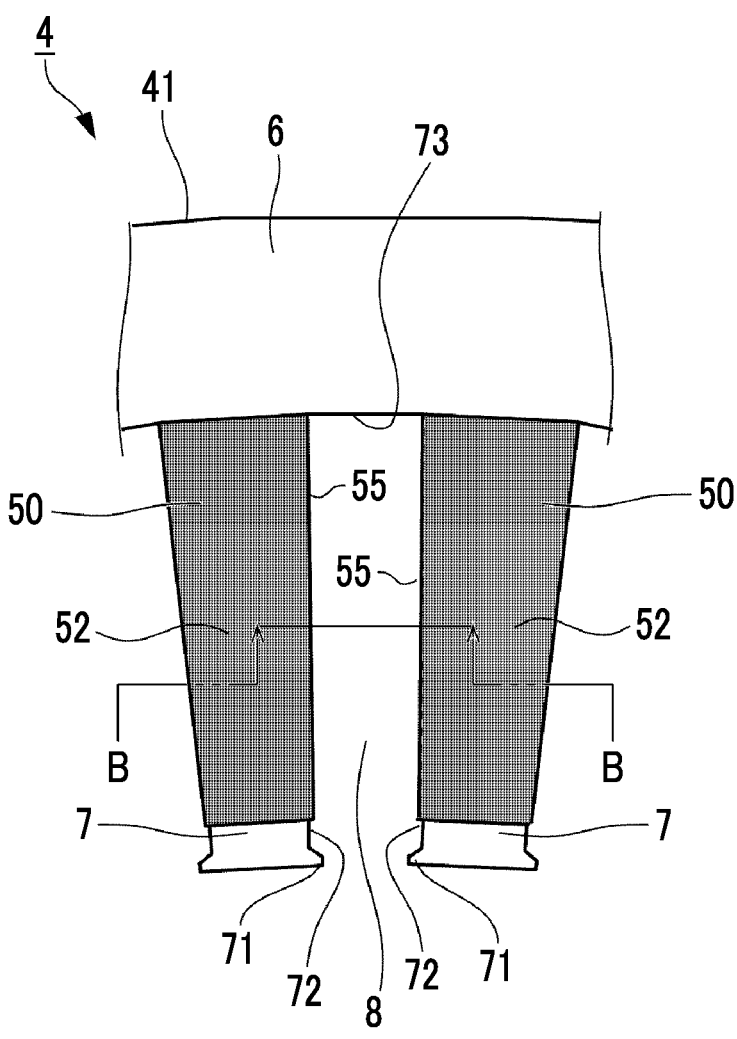
FIG. 4 is an enlarged view showing the periphery of the slot according to the first embodiment, in which a coil and a resin sealing portion in the slot are omitted from FIG. 3.
Figure 5:
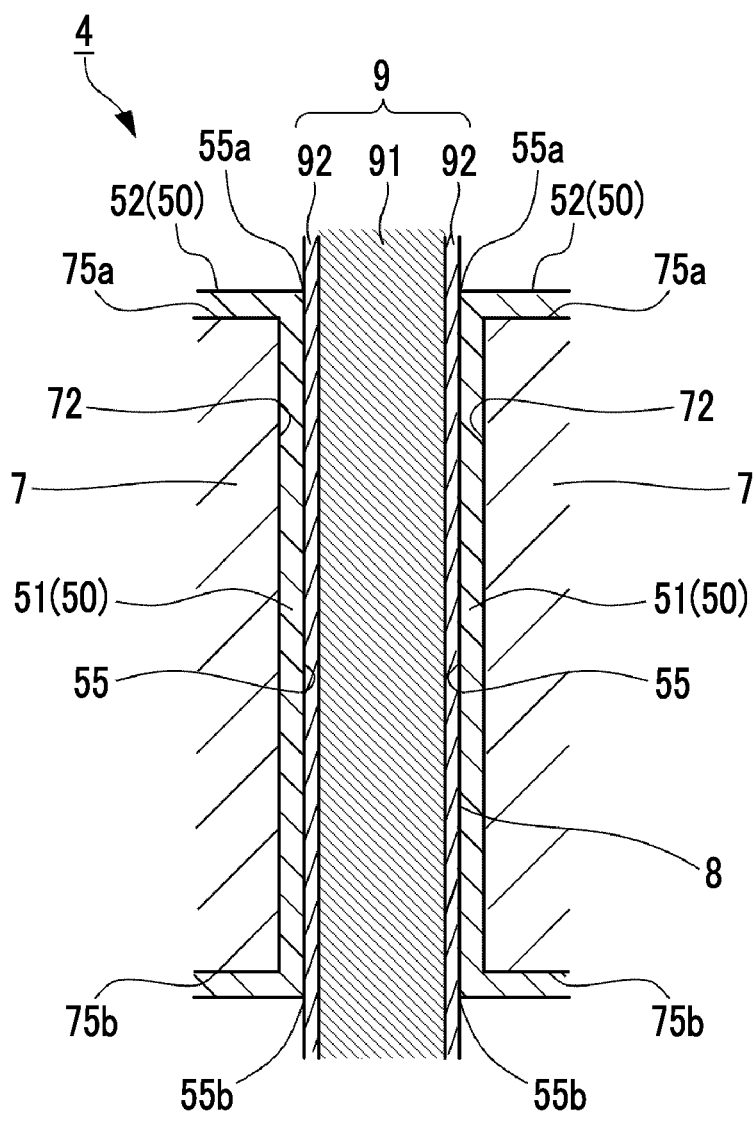
FIG. 5 is a cross-sectional view of the periphery of the slot according to the first embodiment, taken along the line A-A in FIG. 3.
Figure 6:
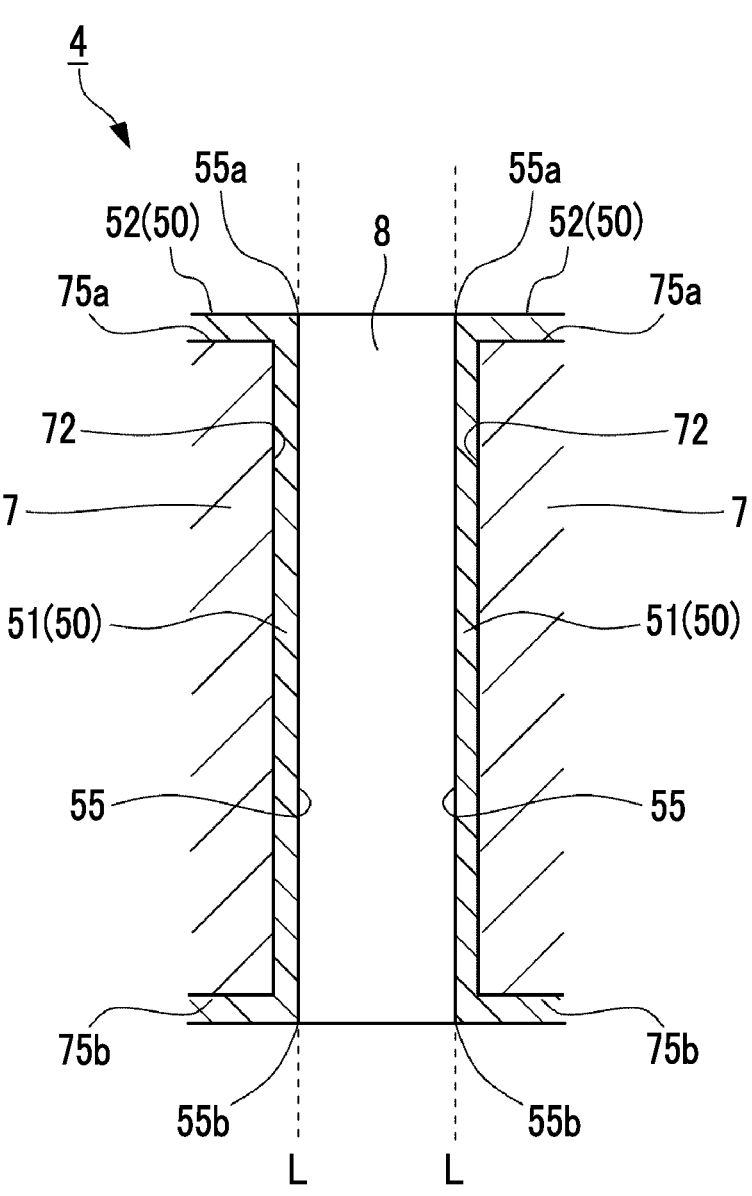
FIG. 6 is a cross-sectional view of the periphery of the slot according to the first embodiment, taken along the line B-B in FIG. 4.
Figure 7:
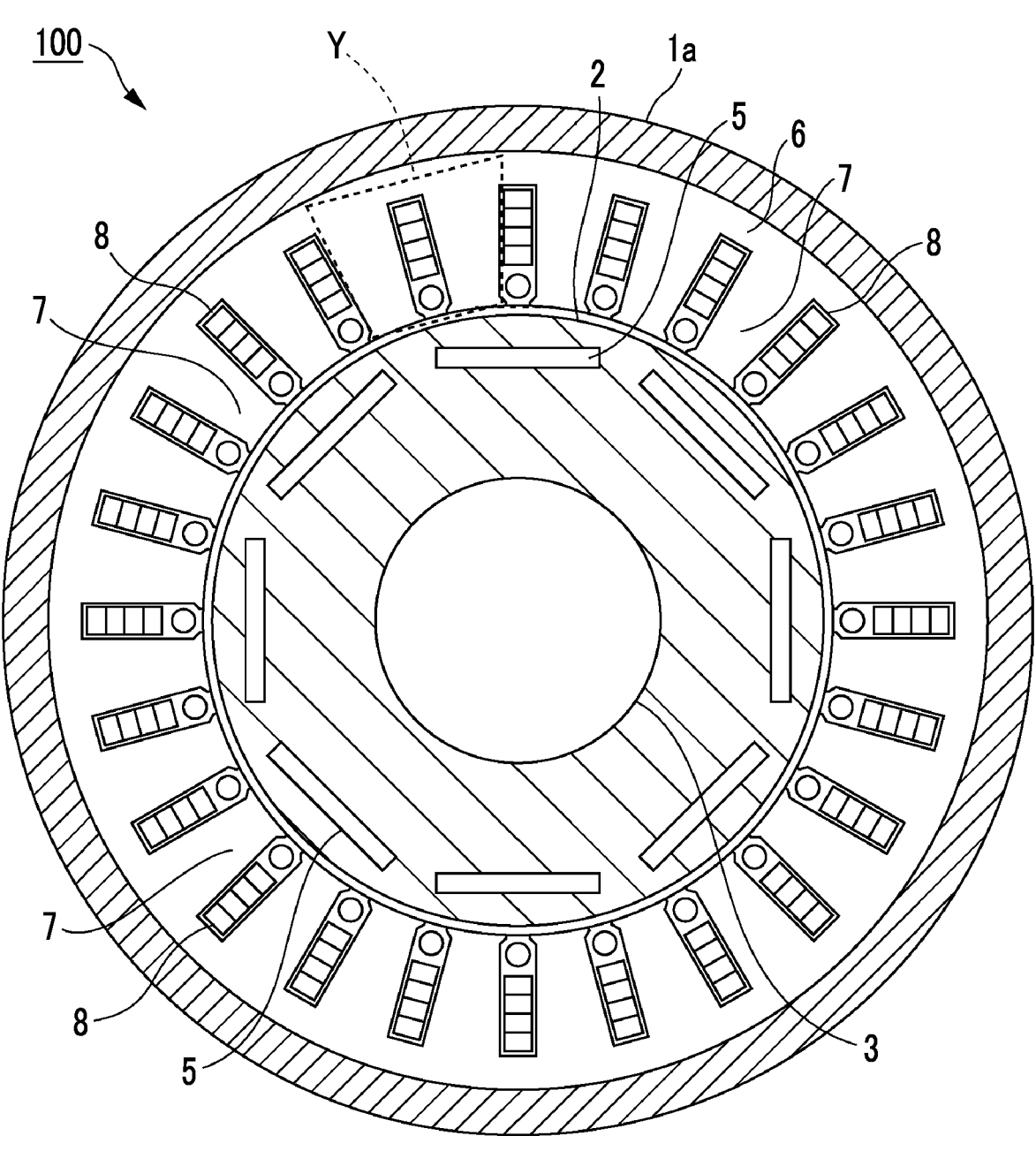
FIG. 7 is a cross-sectional view of a motor according to a second embodiment in a direction perpendicular to a rotating shaft direction.

In this embodiment, an example of application to an electric motor (motor) as a rotating electric machine (electric motor, generator, or dual-use machine of electric motor/generator) will be described. FIG. 1 schematically shows a cross-sectional view of a motor 100 in a direction perpendicular to a rotating shaft direction. FIG. 2 schematically shows a cross-sectional view of the motor 100 in the rotating shaft direction. FIG. 3 is an enlarged view showing the periphery of a slot (area X in FIG. 1), and schematically shows a cross-sectional view of a portion where a coil 9 protrudes from an end portion of a slot 8. FIG. 4 is a view in which the coil 9 and a resin sealing portion 65 of the slot 8 are omitted from FIG. 3. FIG. 5 is a cross-sectional view taken along the line A-A in FIG. 3. FIG. 6 is a cross-sectional view taken along the line B-B in FIG. 4. In FIGS. 3 and 4 and FIG. 7 to be described later, a resin layer 50 is shown in black for the sake of convenience. In the following description, in the motor 100, the side of a rotating shaft 3 will be referred to as the inner peripheral side (or rotating shaft side), and the side of a case 1 will be referred to as the outer peripheral side.

The outline of this embodiment is as follows. In the motor 100, a wall surface 72 of a slot 8 (tooth portion 7) of a stator 4 is covered with a resin layer 50 made of an insulating resin composition. In this case, a wall surface of the resin layer 50 (that is, a resin layer surface 55 of an inner resin layer 51) is made parallel to the rotating shaft of the motor 100. In other words, as shown in FIGS. 5 and 6, in a case where the resin layer surface 55 is viewed in a cross-sectional view, the resin layer surface 55 is straight, not tapered, from one end portion 55a (upper side) to the other end portion 55b (lower side) as indicated by the straight lines L in FIG. 6. In addition, the resin composition of the resin layer 50 contains a thermosetting resin, and has a glass transition temperature Tg of 120° C. or higher.

The description will be given below in more detail.

<Basic Structure of Motor 100>

The motor 100 includes a case 1, and a rotor 2, a stator 4, and a coil 9 accommodated in the case 1.

<Case 1>

The case 1 includes a cylindrical portion 1a and side plate portions 1b and 1c closing both ends in an axial direction of the cylindrical portion 1a. As a material of the case 1, for example, an aluminum alloy (cast product), a resin material, or a combination thereof can be used.

<Rotor 2>

The rotor 2 is accommodated in the case 1. A rotating shaft 3 is attached to a center of the rotor 2 as an output shaft. Both ends of the rotating shaft 3 are supported by the side plate portions 1b and 1c via bearings 3a. Accordingly, the rotor 2 is rotatable around the rotating shaft 3.

A permanent magnet 5 is embedded in the rotor 2. Specifically, as shown in FIG. 1, a plurality of (here, eight) permanent magnets 5 are placed on the same circumference at equal intervals. In this case, the magnetic poles of the adjacent permanent magnets 5 are set to be different from each other.

The cylindrical stator 4 is placed and fixed on the inner peripheral side of the cylindrical portion 1a so as to surround the outer periphery of the rotor 2. A minute gap (air gap) is provided between the inner peripheral surface of the stator 4 and the outer peripheral surface of the rotor 2.

<Stator 4>

The stator 4 is provided by laminating and tightly fixing a plurality of magnetic steel sheets in the axial direction, and is provided with a yoke portion 6 provided annularly when viewed from the end portion in the axial direction as shown in FIG. 1, and a plurality of tooth portions 7 extending from the yoke portion 6 toward the rotor 2 (inner peripheral side). The plurality of tooth portions 7 are arranged at equal intervals in the circumferential direction. Here, as shown in FIG. 1, 24 tooth portions 7 are provided. A slot 8 is provided between the respective tooth portions 7. In addition, the tooth portions 7 are covered with a resin layer 50 provided in a small thickness by circulating with a resin composition.

<Coil 9>

The coil 9 has a rectangular U-shape, and is wound so as to be housed in two slots 8 spaced across the tooth portion 7. Here, the coil 9 is accommodated in a liner member 20 placed in the slot 8 by distributed winding.

The coil 9 has a coil body 91 composed of a good conductor such as copper and having a rectangular cross section, and a resin cover layer 92 covering a surface of the coil body 91. As for the resin cover layer 92, the same material as that to be described later as the resin material of the resin layer 50 can be used.

<Tooth Portion 7>

The tooth portion 7 is provided to correspond to the permanent magnet 5 of the rotor 2 described above, and by sequentially exciting the coils 9, the rotor 2 rotates due to attraction and repulsion with the corresponding permanent magnets 5.

The tooth portion 7 has a large width in a circumferential direction on the outer peripheral side, and has a small width on the inner peripheral side. The tooth portion is tapered toward the inner peripheral side. Tooth tips 71 facing in the circumferential direction are formed at the end portions on the inner peripheral side of the tooth portion 7 so that the width of the slot 8 is reduced.

<Slot 8>

The slot 8 is a space between the adjacent tooth portions 7, and is provided so that wall surfaces 72 of the tooth portions 7 facing in the radial direction are parallel surfaces as shown in FIGS. 3 and 4. A space between the tooth tips 71 is an opening on the inner peripheral side of the slot 8. The slot 8 is provided with a plurality of coils 9 placed on the outer peripheral side (on the side of the yoke portion 6) and a resin sealing portion 65 provided on the inner peripheral side (on the side of the tooth tip 71).

<Resin Layer 50>

As shown in FIGS. 5 and 6, the resin layer 50 covers the peripheries of the tooth portions 7 by integral circulating with a resin composition, and has an inner resin layer 51 covering the wall surface 72 of the tooth portion 7 and an outer resin layer 52 covering an upper surface 75a and a lower surface 75b of the tooth portion 7.

The resin layer 50 covers the tooth portions 7 by circulating in a small-thickness shape by insert molding to tightly fix the stator 4, more specifically, the plurality of magnetic steel sheets laminated in the tooth portion 7.

A surface of the inner resin layer 51 on the inner side of the slot 8, covering the wall surface 72 of the tooth portion 7, that is, a resin layer surface 55 is linearly provided (specifically, indicated by the straight lines L in FIG. 6) without having a tapered shape from one end portion 55a (upper side) to the other end portion 55b (lower side), as shown in FIGS. 5 and 6. In a case where a tapered shape is provided, a certain thickness is required to correspond to the shape. However, since no tapered shape is provided in this embodiment, the thickness of the inner resin layer 51 can be reduced. As a result, the usable space can be increased in the slot 8. For example, it is possible to increase the region occupied by the coils 9, and in other words, it is possible to increase the diameter or the number of the coils. As a result, the output of the motor 100 can be increased.

The thickness of the inner resin layer 51 of the resin layer 50 is 50 μm or more and 500 μm or less. The lower limit of the thickness is preferably 100 μm or more, and more preferably 150 μm or more. The upper limit of the thickness is preferably 400 μm or less, and more preferably 300 μm or less. The thickness of the outer resin layer 52 is not particularly limited, but can be approximately the same as that of the inner resin layer 51.

The lower limit of the thickness is preferably within the above range from the viewpoint of securing the fluidity of the resin composition in an extremely narrow portion between the mold and the tooth portion 7 (wall surface 72) with respect to the axial length of the stator (that is, the thickness of the stator 4) during insert molding.

The upper limit of the thickness is preferably within the above range from the viewpoint of securing the performance such as magnetic flux density and the degree of freedom in size of the coil 9 which can be used due to the increase in space utilization efficiency in the slot 8 in the structure in which the coil 9 is wound on the tooth portion 7 and placed in the slot 8.

<Physical Properties of Resin Layer 50>

For example, the physical properties of the cured resin material constituting the resin layer 50 are as follows.

The cured resin material has a thermal conductivity of 0.5 W/(m·K) or more. The lower limit of the thermal conductivity is preferably 1.0 W/(m·K) or more, and more preferably 2 W/(m·K) or more. The upper limit of the thermal conductivity is not particularly limited, but is 10 W/(m·K) as an actual value.

A glass transition temperature Tg of the resin composition of the resin layer 50 is 120° C. or higher, preferably 140° C. or higher, and more preferably 160° C. or higher. In a case where the glass transition temperature Tg is within the above range, the motor 100 can be used at high temperatures, and is resistant to the heat generated from the coil 9, so that the motor 100 can be used at high output.

The resin composition of the resin layer 50 will be specifically described below.

<Material of Resin Layer 50>

The resin composition of the resin layer 50 preferably contains a thermosetting resin (A), a filler material (B), a curing agent (C), and the like.

[Thermosetting Resin (A)]

Examples of the thermosetting resin (A) include an epoxy resin, a cyanate resin, a polyimide resin, a benzoxazine resin, an unsaturated polyester resin, a phenol resin, a melamine resin, a silicone resin, a bismaleimide resin, a phenoxy resin, and an acrylic resin. As the thermosetting resin (A), one of the above kinds may be used alone, or two or more may be used in combination.

Among these, an epoxy resin, a phenol resin, and a phenoxy resin are preferable as the thermosetting resin (A) from the viewpoint of high insulating properties. An epoxy resin is particularly preferable from the viewpoint of securing the fluidity in an extremely narrow portion during molding.

Examples of the epoxy resin include bisphenol-type epoxy resins such as a bisphenol A-type epoxy resin, a bisphenol F-type epoxy resin, a bisphenol E-type epoxy resin, a bisphenol S-type epoxy resin, a bisphenol M-type epoxy resin (4,4'-(1,3-phenylenediisopridiene)bisphenol epoxy resin), a bisphenol P-type epoxy resin (4,4'-(1,4-phenylenediisopridiene)bisphenol epoxy resin), and a bisphenol Z-type epoxy resin (4,4'-cyclohexydiene bisphenol epoxy resin); novolac-type epoxy resins such as a phenol novolac-type epoxy resin, a cresol novolac-type epoxy resin, a trisphenol group methane-type novolac-type epoxy resin, a tetraphenol group ethane-type novolac-type epoxy resin, and a novolac-type epoxy resin having a condensed ring aromatic hydrocarbon structure; biphenyl-type epoxy resins; arylalkylene-type epoxy resins such as a xylylene-type epoxy resin and a biphenylaralkyl-type epoxy resin; naphthalene-type epoxy resins such as a naphthylene ether-type epoxy resin, a naphthol-type epoxy resin, a naphthalenediol-type epoxy resin, a bifunctional or tetrafunctional epoxy-type naphthalene resin, a binaphthyl-type epoxy resin, and a naphthalene aralkyl-type epoxy resin; anthracene-type epoxy resins; phenoxy-type epoxy resins; dicyclopentadiene-type epoxy resins; norbornene-type epoxy resins; adamantane-type epoxy resins; and fluorene-type epoxy resins. One of the above kinds may be used alone, or two or more may be used in combination.

Among the epoxy resins, one or two or more kinds selected from the group consisting of bisphenol-type epoxy resins, novolac-type epoxy resins, biphenyl-type epoxy resins, arylalkylene-type epoxy resins, naphthalene-type epoxy resins, anthracene-type epoxy resins, and dicyclopentadiene-type epoxy resins are preferable from the viewpoint of further improving the heat resistance and the insulation reliability.

Examples of the phenol resin include novolac-type phenol resins such as a phenol novolac resin, a cresol novolac resin, and a bisphenol A novolac resin, and resol-type phenol resins. One of the above kinds may be used alone, or two or more may be used in combination.

Among the phenol resins, a phenol novolac resin is preferable.

The content of the thermosetting resin (A) is preferably 1% by mass or more, and more preferably 5% by mass or more with respect to the total amount of the resin composition of the resin layer 50. Meanwhile, the content is preferably 30% by mass or less, and more preferably 20% by mass or less with respect to the total amount of the resin composition of the resin layer 50.

In a case where the content of the thermosetting resin (A) is equal to or more than the above lower limit, the handleability of the total amount of the resin composition of the resin layer 50 is improved, the inner resin layer 51 is easily formed, and the strength of the inner resin layer 51 is improved.

In a case where the content of the thermosetting resin (A) is equal to or less than the above upper limit, the linear expansion coefficient and the elastic modulus of the inner resin layer 51 are further improved, or the thermal conductive properties are further improved.

[Filler Material (B)]

In this embodiment, the filler material (B) is used from the viewpoint of improving the thermal conductive properties of the resin layer 50 (more specifically, the inner resin layer 51) and obtaining the strength.

As the filler material (B), an inorganic filler material is preferable, and a thermal conductive filler is particularly preferable. More specific examples of the filler material (B) include silica, alumina, boron nitride, aluminum nitride, and silicon carbide from the viewpoint of balancing the thermal conductive properties with the electrical insulating properties. One of the above kinds may be used alone, or two or more may be used in combination. Among these, alumina or boron nitride is preferable as the filler material (B).

The content of the filler material (B), that is, the content of the filler is preferably 60% by mass or more with respect to the total amount of the resin composition.

[Curing Agent (C)]

In a case where an epoxy resin or a phenol resin is used as the thermosetting resin (A) in the resin composition, the curing agent (C) is preferably further contained.

As the curing agent (C), one or more selected from a curing catalyst (C-1) and a phenol-based curing agents (C-2) can be used.

Examples of the curing catalyst (C-1) include organic metal salts such as zinc naphthenate, cobalt naphthenate, tin octylate, cobalt octylate, bisacetylacetonato cobalt (II), and trisacetylacetonato cobalt (III); tertiary amines such as triethylamine, tributylamine, and 1,4-diazabicyclo[2.2.2]octane; imidazoles such as 2-phenyl-4-methylimidazole, 2-ethyl-4-methylimidazole, 2,4-diethylimidazole, 2-phenyl-4-methyl-5-hydroxyimidazole, and 2-phenyl-4,5-dihydroxymethylimidazole; organic phosphorous compounds such as triphenylphosphine, tri-p-tolylphosphine, tetraphenylphosphoniumtetraphenylborate, triphenylphosphinetriphenylborane, and 1,2-bis-(diphenylphosphino)ethane; phenol compounds such as phenol, bisphenol A, and nonylphenol; organic acids such as an acetic acid, a benzoic acid, a salicylic acid, and a p-toluenesulfonic acid; and mixtures thereof. As the curing catalyst (C-1), one of the above kinds and derivatives thereof can be used alone, or two or more of the above kinds and derivatives thereof can be used in combination.

The content of the curing catalyst (C-1) is not particularly limited, but is preferably 0.001% by mass or more and 1% by mass or less with respect to the total amount of the resin composition.

In addition, examples of the phenol-based curing agent (C-2) include novolac-type phenol resins such as a phenol novolac resin, a cresol novolac resin, a trisphenol methane-type novolac resin, a naphthol novolac resin, and an aminotriazine novolac resin; modified phenol resins such as a terpene-modified phenol resin and a dicyclopentadiene-modified phenol resin; aralkyl-type resins such as a phenol aralkyl resin having a phenylene skeleton and/or a biphenylene skeleton and a naphthol aralkyl resin having a phenylene skeleton and/or a biphenylene skeleton; bisphenol compounds such as bisphenol A and bisphenol F; and resol-type phenol resins, and one of the above kinds may be used alone, or two or more may be used in combination.

Among these, novolac-type phenol resins or resol-type phenol resins are preferable as the phenol-based curing agent (C-2) from the viewpoint of improving the glass transition temperature and reducing the coefficient of linear expansion.

The content of the phenol-based curing agent (C-2) is not particularly limited, but is preferably 1% by mass or more, and more preferably 5% by mass or more with respect to the total amount of the resin composition. Meanwhile, the content is preferably 30% by mass or less, and more preferably 15% by mass or less with respect to the total amount of the resin composition.

[Coupling Agent (D)]

The resin composition may contain a coupling agent (D). The coupling agent (D) can improve the wettability of the interface between the thermosetting resin (A) and the filler material (B).

The coupling agent (D) is not particularly limited, but one or two or more coupling agents selected from, for example, an epoxy silane coupling agent, a cationic silane coupling agent, an aminosilane coupling agent, a titanate-based coupling agent, and a silicone oil-type coupling agent are preferably used.

The content of the coupling agent (D) is not particularly limited, but is preferably 0.05% by mass or more, and more preferably 0.1% by mass or more with respect to 100% by mass of the filler material (B). Meanwhile, the content is preferably 3% by mass or less, and more preferably 2% by mass or less with respect to 100% by mass of the filler material (B).

[Phenoxy Resin (E)]

Furthermore, the resin composition may contain a phenoxy resin (E). In a case where the phenoxy resin (E) is contained, the flex resistance of the resin layer 50 can be improved. Moreover, the elastic modulus can be reduced, and the stress relaxation force of the resin layer 50 can be improved.

In addition, in a case where the phenoxy resin (E) is contained, the viscosity increases, and thus the fluidity is reduced and the occurrence of voids and the like can be suppressed. In addition, in a case where the resin layer 50 is used in close contact with a metal member (that is, tooth portion 7), the adhesion between the metal and the cured body of the resin composition can be improved.

Examples of the phenoxy resin (E) include a phenoxy resin having a bisphenol skeleton, a phenoxy resin having a naphthalene skeleton, a phenoxy resin having an anthracene skeleton, and a phenoxy resin having a biphenyl skeleton. In addition, it is also possible to use a phenoxy resin having a structure having a plurality of these skeletons.

The content of the phenoxy resin (E) is preferably, for example, 3% by mass or more and 10% by mass or less with respect to the total amount of the resin composition.

[Release Agent]

The resin composition preferably contains a release agent. Accordingly, releasability after molding can be increased. Examples of the release agent include natural wax such as carnauba wax, synthetic wax such as montanic acid ester wax and polyethylene oxide wax, higher fatty acids such as zinc stearate and metal salts thereof, and paraffin. One of the above kinds may be used alone, or two or more may be used in combination.

In a case where a release agent is used, the content of the release agent is preferably 0.01% to 3% by mass, and more preferably 0.05% to 2% by mass based on the entire resin molding material. Accordingly, the releasability improving effect can be reliably obtained. As a result, the molding accuracy of the inner resin layer 51 of the resin layer 50 can be increased.

[Other Components]

The resin composition may further contain an antioxidant, a leveling agent, and the like as long as the effects of the present invention are not impaired.

<Resin Sealing Portion 65>

The resin sealing portion 65 is provided on the inner peripheral side of the slot 8 (on the side of the tooth tip 71). The resin sealing portion 65 may be provided by insert molding or may be provided as a separate component. As the resin material used for the resin sealing portion 65, the material described as the resin material of the resin layer 50 can be used.

<Method of Manufacturing Stator 4>

A method of manufacturing the stator 4 according to this embodiment will be described.

First, a stator 4 is prepared by laminating and tightly fixing a plurality of magnetic steel sheets in the axial direction (stator preparation step).

Then, by insert molding, a resin layer 50 is formed to cover the peripheries (wall surface 73, upper surface 75a, and lower surface 75b) of tooth portions 7 by integral circulating with an insulating resin composition (resin layer forming step).

Next, a coil 9 is placed in a slot 8 provided with the resin layer 50 (coil placing step).

After all the coils 9 are accommodated, the region on the inner peripheral side of the slot 8 is filled with a resin material, and insert molding is performed. Thus, a resin sealing portion 65 is obtained (resin filling step).

Through the above steps, the stator 4 shown in FIG. 3 is obtained.

Summary of First Embodiment

The features of this embodiment are summarized as follows.

(1) The stator 4 is a stator having a stator core 41 having a plurality of tooth portions 7, a slot 8 provided between the tooth portions 7 and accommodating a coil 9, and the coil 9 accommodated in the slot 8, in which the stator has a resin layer 50 provided on an inner surface of the slot 8 and made of an insulating resin composition, a wall surface (a resin layer surface 55 of an inner resin layer 51) of the resin layer 50 on the inner side of the slot 8 is provided in parallel with a rotating shaft direction, the resin composition of the resin layer 50 contains a thermosetting resin, and the thermosetting resin has a glass transition temperature Tg of 120° C. or higher.

Since the resin layer surface 55 is parallel to the rotating shaft direction, that is, linearly provided without an inclination such as a tapered shape, the inner resin layer 51 can be provided in a small thickness. In addition, with the use of a thermosetting resin having a glass transition temperature Tg of 120° C. or higher, the motor 100 can be used at high temperatures. In addition, it is possible to deal with an increase in heat generated following an increase in output of the motor 100.

(2) The resin composition of the resin layer 50 contains wax as a release agent. Accordingly, releasability after molding can be increased, and molding defects can be suppressed even in a case where the inner resin layer 51 is provided in a small thickness.

(3) The resin composition of the resin layer 50 contains a filler as a filler material. Accordingly, the strength of the resin layer 50 can be increased.

(4) The filler content of the resin composition of the resin layer 50 is 60% by volume or more with respect to the total amount of the resin composition. Accordingly, the strength of the resin layer 50 can be increased.

(5) The thickness of the resin layer 50 is 50 μm or more and 500 μm or less. Accordingly, the space utilization efficiency in the slot 8 can be increased, and the fluidity of the resin composition in an extremely narrow portion can be secured.

(6) The thermal conductivity of the resin layer 50 is 0.5 W/(m·K) or more. Accordingly, the heat of the coil 9 can be smoothly transferred to the stator 4.

(7) The thermosetting resin is an epoxy resin. Accordingly, high heat resistance and insulation reliability are obtained.

(8) The coil 9 has a resin cover layer 92 covering a coil surface (coil body 91) with a resin. Accordingly, it is possible to secure good insulating properties of the coil 9.

(9) A rotating electric machine (motor 100) having the above-described stator 4.

(10) A method of manufacturing a stator 4 used for a rotating electric machine (here, motor 100), having a stator core 41 having a plurality of tooth portions 7, a slot 8 provided between the tooth portions 7 and accommodating a coil 9, and the coil 9 accommodated in the slot 8, having:

a resin layer forming step of forming a resin layer 50 made of an insulating resin composition on an inner surface of the slot 8, that is, a wall surface 72 of the tooth portion 7; and a coil placing step of placing the coil 9 in the slot 8 provided with the resin layer 50, in which a wall surface (a resin layer surface 55 of an inner resin layer 51) of the resin layer 50 on the inner side of the slot 8 is provided in parallel with a rotating shaft direction of the rotating electric machine (motor 100), the resin composition contains a thermosetting resin, and the thermosetting resin has a glass transition temperature Tg of 120° C. or higher.

Second Embodiment

Figure 8:
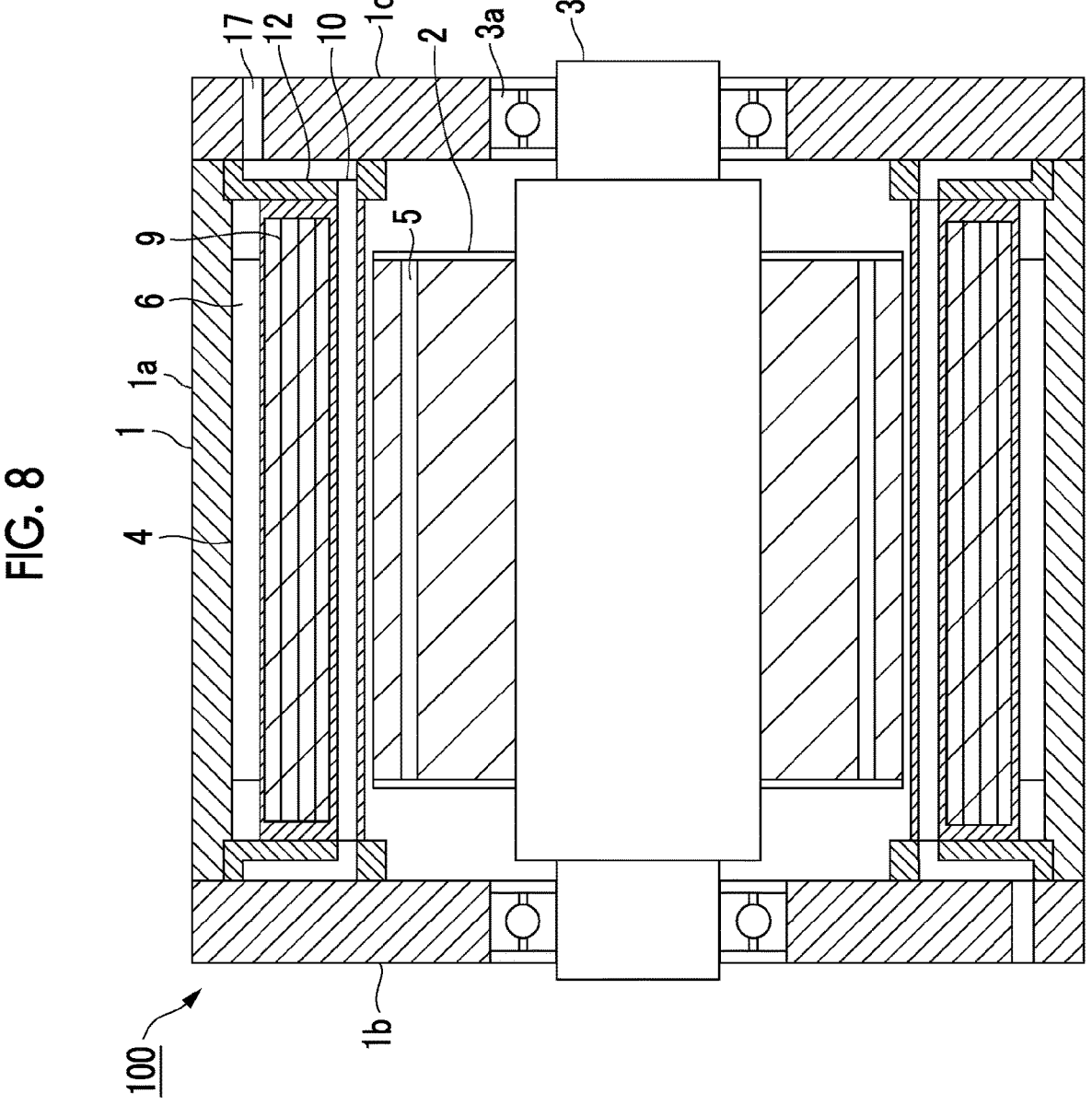
FIG. 8 is a vertical cross-sectional view of the motor according to the second embodiment in the rotating shaft direction.
Figure 9:
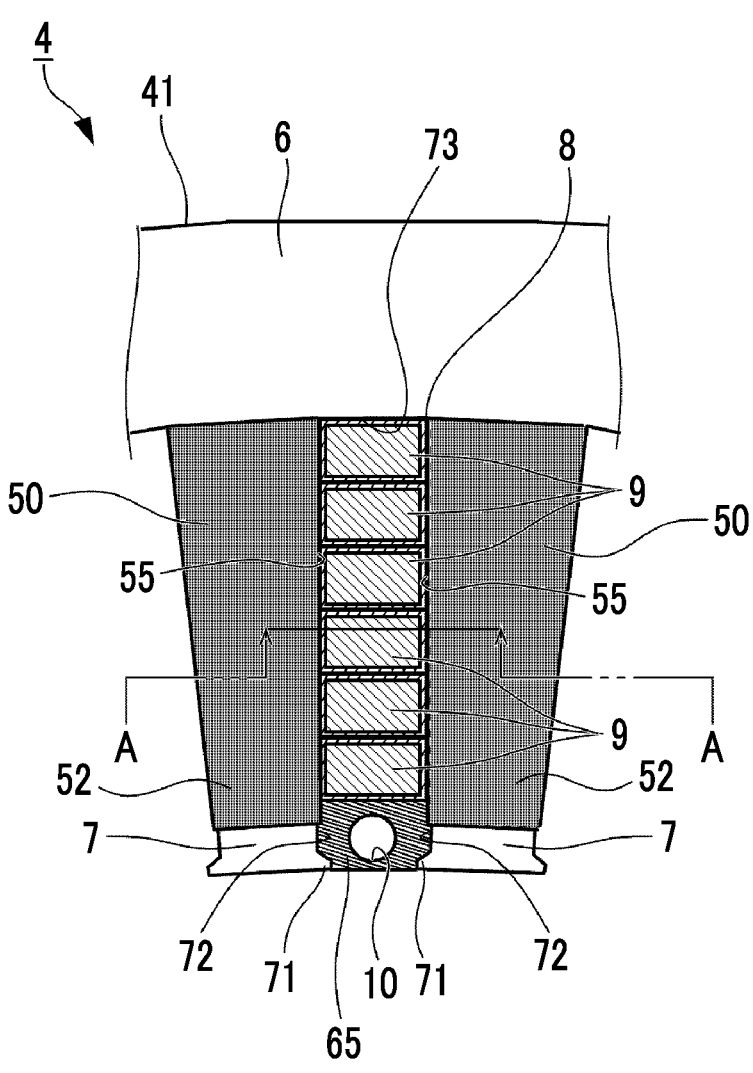
FIG. 9 is an enlarged view showing the periphery of a slot according to the second embodiment.

A second embodiment will be described with reference to FIGS. 7 to 9. FIG. 7 schematically shows a cross-sectional view of a motor 100 in a direction perpendicular to a rotating shaft direction. FIG. 8 schematically shows a cross-sectional view of the motor 100 in the rotating shaft direction. FIG. 9 is an enlarged view of the periphery of a slot (area Y in FIG. 7), and schematically shows a cross-sectional view of a portion where a coil 9 protrudes from an end portion of a slot 8.

Differences from the first embodiment will be described below. In this embodiment, unlike the first embodiment, a resin sealing portion 65 is provided with a cooling water channel 10, and a case 1 is provided with an external connection flow passage 17 connecting an external cooling flow passage via a connection member 12. The description will be given below in more detail.

In this embodiment, side plate portions 1b and 1c of the case 1 are provided with the external connection flow passage 17 connecting the cooling water channel 10 in the slot 8 and an external cooling flow passage via the connection member 12.

The resin sealing portion 65 is provided with the cooling water channel 10 extending in an axial direction. Cooling liquid, for example, cooling water circulates in the cooling water channel 10. The cooling water channel 10 can be formed by a method of directly molding a resin material, or a method of inserting a tubular component in the slot 8 and filling the surrounding places with a resin material.

The number of cooling water channels 10 placed in one slot 8 may be either one or more, but in a situation where the slot 8 has a narrow space width, the number of cooling water channels 10 is preferably small so that the channel has a large cross-sectional area in consideration of the channel resistance when the cooling liquid passes. The cross-sectional shape of the cooling water channel 10 may be circular as in this embodiment, or may be quadrangular or matched to the shape of the slot 8.

<Method of Manufacturing Stator 4>

A method of manufacturing the stator 4 according to this embodiment will be described.

A stator preparation step, a resin layer forming step, and a coil placing step are performed as in the first embodiment. Next, after all the coils 9 are accommodated, a mold structure (nesting structure) corresponding to the cooling water channel 10 is placed in a predetermined region on the inner peripheral side of the slot 8, and insert molding is performed to obtain the resin sealing portion 65 having the cooling water channel 10 (resin filling step).

Through the above steps, the stator 4 shown in FIGS. 7 to 9 is obtained.

The features of this embodiment are summarized as follows.

This embodiment has the same features as the features (1) to (10) of the first embodiment. Furthermore, due to the cooling water channel 10 provided as a configuration for cooling the coil 9, it is possible to deal with an increase in output of the motor 100.

Third Embodiment

A third embodiment will be described with reference to FIGS. 10 and 11A to 11D.

Figure 10:
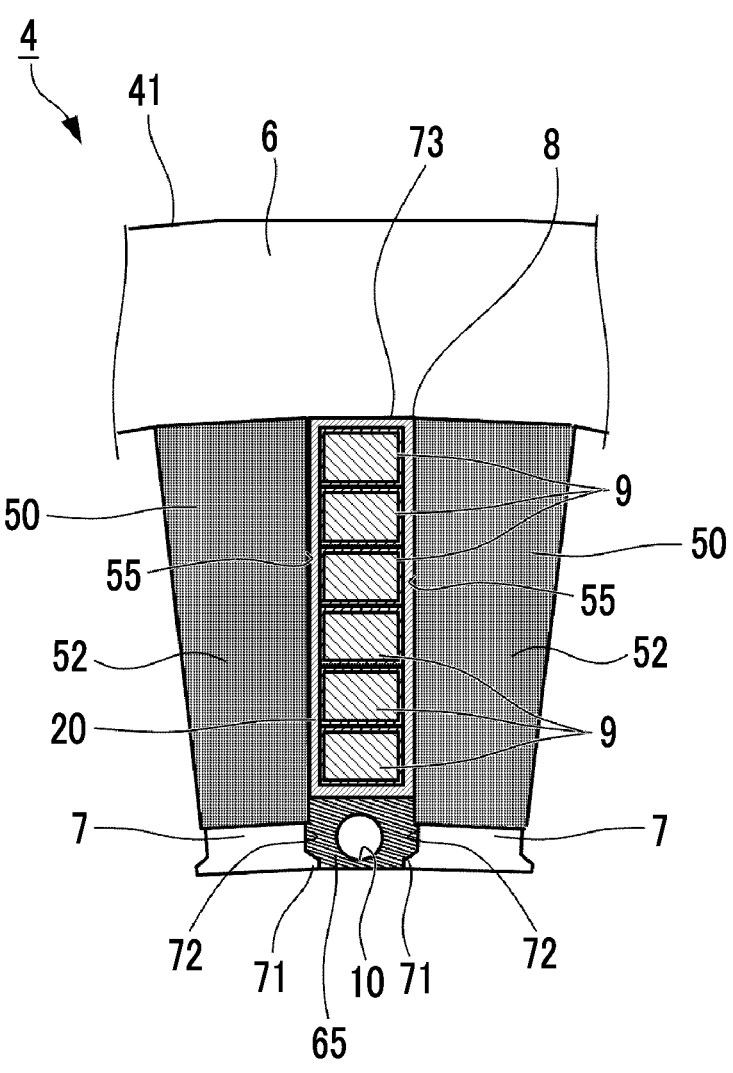
FIG. 10 is an enlarged view showing the periphery of a slot according to a third embodiment.

FIG. 10 is an enlarged view of the periphery of a slot. Differences from the second embodiment will be described below. In this embodiment, unlike the second embodiment, a liner member 20 is used when a coil 9 is accommodated in a slot 8.

<Liner Member 20>

The liner member 20 is a tubular member made of a resin material, which is long in a rotating shaft direction and has a frame-like cross section. The inside of the frame of the liner member 20 serves as a coil accommodation portion 21 accommodating a coil 9.

End portions in a longitudinal direction of the liner member 20 protrude outward from both ends of a stator 4 (that is, both ends of a slot 8) by a predetermined length. The liner member 20 is previously manufactured as a separate member by, for example, extrusion, and placed in the slot 8 during manufacturing of a motor 100.

As shown in FIG. 10, the liner member 20 has a square frame-like cross section. In a state in which the liner member 20 is placed in the slot 8, the outer peripheral surface of the liner member 20 is in close contact with wall surfaces 72 and 73 and a resin sealing portion 65 of the slot 8. Here, the outer peripheral surface of the liner member 20 is linearly provided in parallel with the rotating shaft direction as in the case of the inner resin layer 51. Accordingly, the inner resin layer 51 and the liner member 20 can be in close contact with each other as a whole, and the heat transfer characteristics from the liner member 20 to the resin layer 50 can be improved. In other words, the resin layer surface 55 of the inner resin layer 51 is linearly provided in parallel with the rotating shaft direction without having a tapered shape, and similarly, the outer peripheral surface of the liner member 20 (the region in contact with the resin layer surface 55) is also linearly provided in parallel with the rotating shaft direction without having a tapered shape. Accordingly, the liner member 20 and the resin layer surface 55 can be brought into close contact with each other with no gap therebetween.

The thickness of the liner member 20 is, for example, about 0.3 mm at the thinnest region (between the wall surfaces 72 and 73 and the liner inner surface of the liner member 20).

<Material of Liner Member 20>

Examples of the material of the liner member 20 include the material described as the material of the resin layer 50 in the first embodiment.

<Kinds of Shape of Liner Member 20>

FIGS. 11A to 11D show examples of the shape of the liner member 20. Here, four kinds of cross-sectional shapes are exemplified.

Figures 11A, 11B, 11C, 11D:
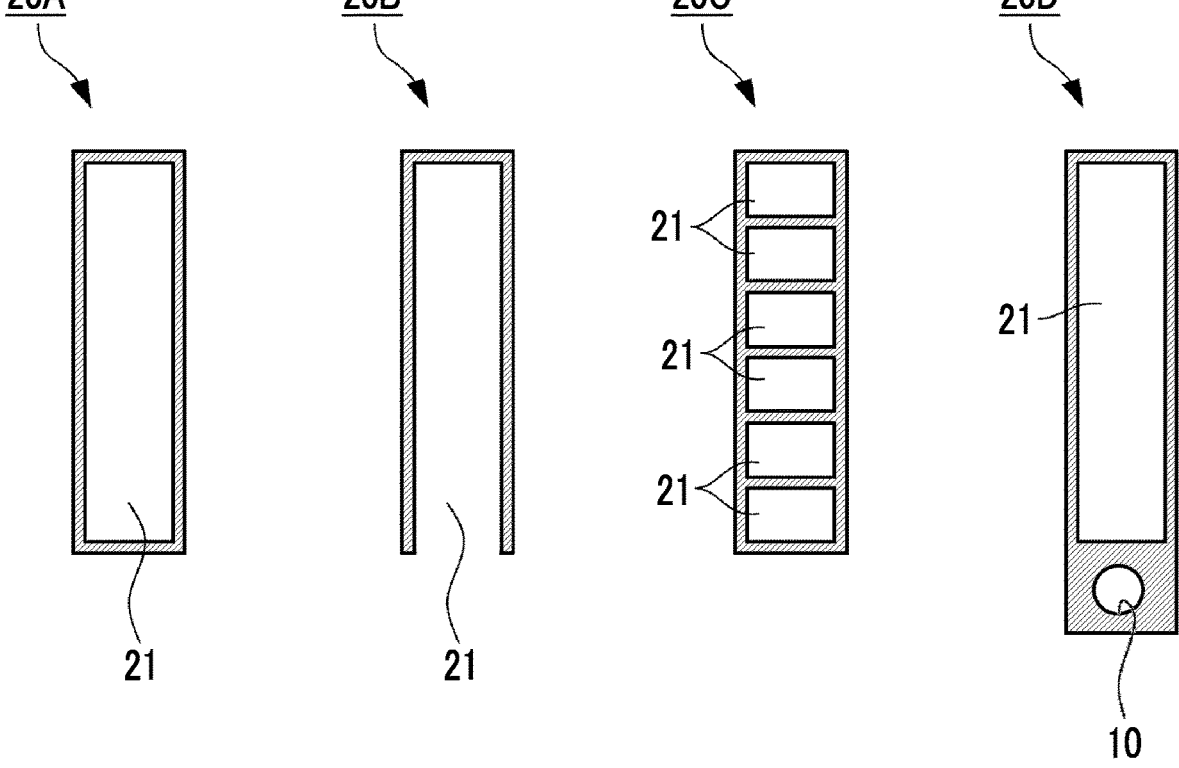
FIGS. 11A to 11D are views showing four kinds of shapes of a liner member according to the third embodiment.

A liner member 20A in FIG. 11A corresponds to the shape of the liner member 20 shown in FIG. 10 and has a square frame-like cross section, and a plurality of coils 9 are accommodated in the common coil accommodation portion 21.

A liner member 20B in FIG. 11B has a U-shaped frame-like cross section. In a case where the liner member 20 is accommodated in the slot 8, the open end portion side is placed so as to be positioned on the side of the resin sealing portion 65.

A liner member 20C in FIG. 11C has a shape in which a plurality (here, five) of coil accommodation portions 21 having a square frame-like cross section are connected. A coil 9 is accommodated in each coil accommodation portion 21. Accordingly, the insulation between the coils 9 can be reliably secured.

A liner member 20D in FIG. 11D has a configuration in which the liner member 20 and the resin sealing portion 65 of the first embodiment are formed integrally with each other.

The features of this embodiment are summarized as follows.

This embodiment has the same features as the features (1) to (10) of the first embodiment, and has a feature (11) below.

(11) The rotating electric machine (motor 100) has a resin liner member 20 (20A, 20B, 20C, and 20D) accommodating a coil 9, and the coil 9 is accommodated in the slot 8 in a state of being accommodated in the liner member 20.

Accordingly, the coil 9 can be accommodated in the slot 8 with high accuracy. As a result, the output efficiency of the motor 100 can be increased, and vibration and noise can be suppressed.

Fourth Embodiment

In this embodiment, a resin hollow body, a module, a method of manufacturing the resin hollow body, and a method of manufacturing the module will be described.

Resin hollow bodies such as resin pipe products and resin pipe components are lighter and have more excellent moldability than metal pipes. Therefore, these have been used in various fields, and various technologies have been proposed. For example, there has been proposed a technology for increasing the degree of freedom in designing in the manufacturing of a resin pipe with one closed end portion by injection molding (for example, Japanese Patent No. 5864373).

In recent years, as described above, it has been desired to realize various products by applying resin hollow bodies such as resin pipes from the features of the resin pipes. In particular, there is an increasing demand for application of resin hollow bodies having a small-diameter pipe structure to products operating in a high temperature range, such as power modules and the motor 100 described in the second embodiment. In general, in the production of a small-diameter pipe, in a case where a length L is longer than an inner diameter D (that is, in a case where L/D is large), a manufacturing method by extrusion molding, more specifically, a molded product formed of a plasticized product is used. However, required specifications may not be met in a product operating in a high temperature range, so technologies using a thermosetting resin have been required.

In this embodiment, a resin hollow body having a long linear pipe structure made of a thermosetting resin, a module using the resin hollow body, and manufacturing methods of the resin hollow body and the module will be described.

The outline of this embodiment is as follows.

1. A resin hollow body having a long linear pipe structure made of a thermosetting resin, in which a ratio L/D1 of a length L to an inner diameter D1 of the pipe structure is 20 or more and 125 or less.

2. The resin hollow body according to 1, in which an end portion of an inner surface of the pipe structure is formed straight without a tapered shape.

3. The resin hollow body according to 1 or 2, in which the thermosetting resin consists of an epoxy resin.

4. The resin hollow body according to any one of 1 to 3, in which the inner diameter D1 of the pipe structure is 1.8 mm or more and 3.5 mm or less.

5. The resin hollow body according to any one of 1 to 4, in which a thickness t of the pipe structure is 0.10 mm or more and 1 mm or less.

6. The resin hollow body according to any one of 1 to 5, in which an outer diameter D2 of the pipe structure is 2.0 mm or more and 4.5 mm or less.

7. A module having the resin hollow body according to any one of 1 to 6 formed integrally therewith.

8. The module according to 7, in which the resin hollow body is provided as a water channel for cooling.

9. A method of manufacturing a resin hollow body having a long linear pipe structure, including:

a resin filling step of filling a mold for molding having a long linear mold pin having an outer peripheral surface corresponding to an inner peripheral surface of the pipe structure with a thermosetting resin; and a mold pin drawing step of drawing out the mold pin, in which a ratio L/D1 of a length L to an inner diameter D1 of the pipe structure is 20 or more and 125 or less.

10. The method of manufacturing a resin hollow body according to 9, in which the mold pin does not have a tapered shape for drawing.

11. The method of manufacturing a resin hollow body according to 9 or 10, in which the thermosetting resin consists of an epoxy resin.

12. The method of manufacturing a resin hollow body according to any one of 9 to 11, in which the inner diameter D1 of the pipe structure is 1.8 mm or more and 3.5 mm or less.

13. The method of manufacturing a resin hollow body according to any one of 9 to 12, in which a thickness t of the pipe structure is 0.10 mm or more and 1 mm or less.

14. The method of manufacturing a resin hollow body according to any one of 9 to 13, in which an outer diameter D2 of the pipe structure is 2.0 mm or more and 4.5 mm or less.

15. The method of manufacturing a resin hollow body according to any one of 9 to 14, in which a filling pressure in a case where the thermosetting resin is applied into the mold for molding is 10 MPa or more and 12 MPa or less.

16. A method of manufacturing a module having the resin hollow body by using the method of manufacturing a resin hollow body according to any one of 9 to 15.

17. The method of manufacturing a module according to 16, in which the resin hollow body is manufactured as a water channel for cooling.

A configuration in which a resin pipe (resin hollow body) is applied to cooling of a power module (power semiconductor chip) will be specifically described below, but the resin pipe can also be applied to, for example, the cooling water channel of the motor 100 of the second embodiment described above.

<Power Module 201>

A power module 201 according to this embodiment will be described.

FIG. 12 is a schematic view of the power module 201 according to this embodiment, showing a cross-sectional view. FIGS. 13A and 13B are schematic views of a small-diameter resin pipe 200.

The power module 201 has a power semiconductor chip 202, a sintering layer 203, a Cu circuit 204, a heat dissipating sheet 205, a Cu base plate 206, and a lead frame 207, and is sealed with a resin sealing layer 209 (sealing material). Furthermore, the power module 201 has a first water channel for cooling 210 provided in the resin sealing layer 209 and a second cooling water channel 220 provided in the Cu base plate 206.

<Power Semiconductor Chip 202>

The power semiconductor chip 202 is, for example, an insulated gate bipolar transistor (IGBT), a diode, or the like. An electrode pattern (not shown) is formed on an upper surface of the power semiconductor chip 202, and a conductive pattern (not shown) is formed on a lower surface of the power semiconductor chip 202.

The lower surface of the power semiconductor chip 202 is bonded to one surface of the Cu circuit 204 via the sintering layer 203 which is a bonding layer. The electrode pattern on the upper surface of the power semiconductor chip 202 is electrically connected to the lead frame 207.

<Sintering Layer 203>

The sintering layer 203 is a bonding layer formed by sintering a sintering paste containing metal particles. As the sintering paste, any one of an Ag sintering paste containing silver particles, an AL sintering paste containing aluminum particles, and a Cu sintering paste containing copper particles can be used.

The above-described sintering paste is provided and laminated between the power semiconductor chip 202 and the Cu circuit 204, and the power semiconductor chip 202 and the Cu circuit 204 are bonded by the sintering layer 203 through a sintering step. In addition, the lead frame 207 and the Cu circuit 204 are bonded by the sintering layer 203.

In the sintering layer 203, a sintering network (metal bonding bus) by metal particles is formed, and high thermal conductive properties and low electrical resistance are realized. From the viewpoint of an improvement in bonding properties by the sintering layer 203, the Cu circuit 204 and the lead frame 207 may be surface-treated by plating with the metal contained in the sintering paste. Specifically, in this embodiment, surfaces of the Cu circuit 204 and the lead frame 207 may be plated with Ag.

<Cu Circuit 204>

The Cu circuit 204 is a metal circuit board made of a conductive metal material. The power semiconductor chip 202 is provided on the circuit pattern formed on one surface (upper surface in the drawing) of the Cu circuit 204 via the sintering layer 203 which is a bonding layer.

The Cu circuit 204 is a circuit board obtained by patterning a metal material, and has a thickness of, for example, 0.3 mm or more and 5 mm or less. For example, thick copper (rolled copper) can be suitably used as the metal material constituting the Cu circuit 204. Accordingly, the Cu circuit 204 has a relatively small resistance value. At least a part of the Cu circuit 204 may be covered with a solder resist layer.

The Cu circuit 204 is formed by, for example, processing a metal layer (such as thick copper), laminated on an upper surface of the Cu base plate 206 via the heat dissipating sheet 205, into a predetermined pattern by cutting and etching. Otherwise, a metal layer previously processed into a predetermined pattern is stuck to the Cu circuit 204 with the heat dissipating sheet 205.

The lower limit of the thickness of the Cu circuit 204 is, for example, 0.3 mm or more. In a case where the thickness is equal to or more than the above numerical value, it is possible to suppress heat generation of the circuit pattern even in applications requiring a high current. In addition, the upper limit of the thickness of the circuit pattern is, for example, 5.0 mm or less, preferably 4.0 mm or less, and more preferably 3.0 mm or less. In a case where the thickness is equal to or less than the above numerical value, the circuit processability can be improved, and the thickness of the board can be reduced as a whole.

<Heat Dissipating Sheet 205>

The heat dissipating sheet 205 is placed between the Cu circuit 204 and the Cu base plate 206. The heat of the power semiconductor chip 202 is received by the Cu circuit 204, and further transferred to the Cu base plate 206 which is a heat dissipation unit via the heat dissipating sheet 205.

The planar shape of the heat dissipating sheet 205 is not particularly limited, but can be appropriately selected according to the shapes of the Cu circuit 204 and the Cu base plate 206. For example, the planar shape may be rectangular. The film thickness of the heat dissipating sheet 205 is, for example, 50 μm or more and 250 μm or less. Accordingly, the heat of the Cu circuit 204 can be more effectively transferred to the Cu base plate 206 while improving the mechanical strength and heat resistance. Furthermore, the heat dissipation properties and the insulating properties of the heat dissipating sheet 205 are well balanced. The thermal conductivity of the heat dissipating sheet 205 is not particularly limited. However, a heat dissipating sheet having a thermal conductivity of preferably 10 W/mK (175° C.) or more, and more preferably 15 W/mK (175° C.) or more is used.

[Material of Heat Dissipating Sheet 205]

The heat dissipating sheet 205 is, for example, a resin sheet, and is formed using a resin composition for a sheet. The resin composition for a sheet will be described below.

In this embodiment, the resin composition for a sheet preferably contains a thermosetting resin (A), a filler material (B), a curing agent (C), and the like. In a case where a thermosetting resin is contained, the thermosetting resin (A) is B-staged for the heat dissipating sheet 205.

[Thermosetting Resin (A)]

Examples of the thermosetting resin (A) include an epoxy resin, a cyanate resin, a polyimide resin, a benzoxazine resin, an unsaturated polyester resin, a phenol resin, a melamine resin, a silicone resin, a bismaleimide resin, a phenoxy resin, and an acrylic resin. As the thermosetting resin (A), one of the above kinds may be used alone, or two or more may be used in combination.

Among these, an epoxy resin, a phenol resin, and a phenoxy resin are preferable as the thermosetting resin (A) from the viewpoint of high insulating properties.

Examples of the epoxy resin include bisphenol-type epoxy resins such as a bisphenol A-type epoxy resin, a bisphenol F-type epoxy resin, a bisphenol E-type epoxy resin, a bisphenol S-type epoxy resin, a bisphenol M-type epoxy resin (4,4'-(1,3-phenylenediisopridiene)bisphenol epoxy resin), a bisphenol P-type epoxy resin (4,4'-(1,4-phenylenediisopridiene)bisphenol epoxy resin), and a bisphenol Z-type epoxy resin (4,4'-cyclohexydiene bisphenol epoxy resin); novolac-type epoxy resins such as a phenol novolac-type epoxy resin, a cresol novolac-type epoxy resin, a trisphenol group methane-type novolac-type epoxy resin, a tetraphenol group ethane-type novolac-type epoxy resin, and a novolac-type epoxy resin having a condensed ring aromatic hydrocarbon structure; biphenyl-type epoxy resins; arylalkylene-type epoxy resins such as a xylylene-type epoxy resin and a biphenylaralkyl-type epoxy resin; naphthalene-type epoxy resins such as a naphthylene ether-type epoxy resin, a naphthol-type epoxy resin, a naphthalenediol-type epoxy resin, a bifunctional or tetrafunctional epoxy-type naphthalene resin, a binaphthyl-type epoxy resin, and a naphthalene aralkyl-type epoxy resin; anthracene-type epoxy resins; phenoxy-type epoxy resins; dicyclopentadiene-type epoxy resins; norbornene-type epoxy resins; adamantane-type epoxy resins; and fluorene-type epoxy resins. One of the above kinds may be used alone, or two or more may be used in combination.

Among the epoxy resins, one or two or more kinds selected from the group consisting of bisphenol-type epoxy resins, novolac-type epoxy resins, biphenyl-type epoxy resins, arylalkylene-type epoxy resins, naphthalene-type epoxy resins, anthracene-type epoxy resins, and dicyclopentadiene-type epoxy resins are preferable from the viewpoint of further improving the heat resistance and the insulation reliability.

Examples of the phenol resin include novolac-type phenol resins such as a phenol novolac resin, a cresol novolac resin, and a bisphenol A novolac resin, and resol-type phenol resins. One of the above kinds may be used alone, or two or more may be used in combination.

Among the phenol resins, a phenol novolac resin is preferable.

The content of the thermosetting resin (A) is preferably 1% by mass or more, and more preferably 5% by mass or more with respect to the total amount of the resin composition for a sheet. Meanwhile, the content is preferably 30% by mass or less, and more preferably 20% by mass or less with respect to the total amount of the resin composition for a sheet.

In a case where the content of the thermosetting resin (A) is equal to or more than the above lower limit, the handleability of the resin composition for a sheet is improved, the heat dissipating and insulating sheet is easily formed, and the strength of the heat dissipating and insulating sheet is improved.

In a case where the content of the thermosetting resin (A) is equal to or less than the above upper limit, the linear expansion coefficient and the elastic modulus of the heat dissipating and insulating sheet are further improved, or the thermal conductive properties are further improved.

[Filler Material (B)]

In this embodiment, the filler material (B) is used from the viewpoint of improving the thermal conductive properties of the heat dissipating sheet 205 and obtaining the strength.

As the filler material (B), a thermal conductive filler is preferable. More specific examples of the filler material (B) include silica, alumina, boron nitride, aluminum nitride, and silicon carbide from the viewpoint of balancing the thermal conductive properties with the electrical insulating properties. One of the above kinds may be used alone, or two or more may be used in combination. Among these, alumina or boron nitride is preferable as the filler material (B).

The content of the filler material (B) is preferably 90% by mass or less, and more preferably 80% by mass or less with respect to the total amount of the resin composition for a sheet. Meanwhile, the content is preferably 40% by mass or more, and more preferably 50% by mass or more with respect to the total amount of the resin composition for a sheet from the viewpoint of thermal conductive properties.

[Curing Agent (C)]

In a case where an epoxy resin or a phenol resin is used as the thermosetting resin (A) in the resin composition for a sheet, the curing agent (C) is preferably further contained.

As the curing agent (C), one or more selected from a curing catalyst (C-1) and a phenol-based curing agents (C-2) can be used.

Examples of the curing catalyst (C-1) include organic metal salts such as zinc naphthenate, cobalt naphthenate, tin octylate, cobalt octylate, bisacetylacetonato cobalt (II), and trisacetylacetonato cobalt (III); tertiary amines such as triethylamine, tributylamine, and 1,4-diazabicyclo[2.2.2]octane; imidazoles such as 2-phenyl-4-methylimidazole, 2-ethyl-4-methylimidazole, 2,4-diethylimidazole, 2-phenyl-4-methyl-5-hydroxyimidazole, and 2-phenyl-4,5-dihydroxymethylimidazole; organic phosphorous compounds such as triphenylphosphine, tri-p-tolylphosphine, tetraphenylphosphonium·tetraphenylborate, triphenylphosphine·triphenylborane, and 1,2-bis-(diphenylphosphino)ethane; phenol compounds such as phenol, bisphenol A, and nonylphenol; organic acids such as an acetic acid, a benzoic acid, a salicylic acid, and a p-toluenesulfonic acid; and mixtures thereof. As the curing catalyst (C-1), one of the above kinds and derivatives thereof can be used alone, or two or more of the above kinds and derivatives thereof can be used in combination.

The content of the curing catalyst (C-1) is not particularly limited, but is preferably 0.001% by mass or more and 1% by mass or less with respect to the total amount of the resin composition for a sheet.

In addition, examples of the phenol-based curing agent (C-2) include novolac-type phenol resins such as a phenol novolac resin, a cresol novolac resin, a trisphenol methane-type novolac resin, a naphthol novolac resin, and an aminotriazine novolac resin; modified phenol resins such as a terpene-modified phenol resin and a dicyclopentadiene-modified phenol resin; aralkyl-type resins such as a phenol aralkyl resin having a phenylene skeleton and/or a biphenylene skeleton and a naphthol aralkyl resin having a phenylene skeleton and/or a biphenylene skeleton; bisphenol compounds such as bisphenol A and bisphenol F; and resol-type phenol resins, and one of the above kinds may be used alone, or two or more may be used in combination.

Among these, novolac-type phenol resins or resol-type phenol resins are preferable as the phenol-based curing agent (C-2) from the viewpoint of improving the glass transition temperature and reducing the coefficient of linear expansion.

The content of the phenol-based curing agent (C-2) is not particularly limited, but is preferably 1% by mass or more, and more preferably 5% by mass or more with respect to the total amount of the resin composition for a sheet. Meanwhile, the content is preferably 30% by mass or less, and more preferably 15% by mass or less with respect to the total amount of the resin composition for a sheet.

[Coupling Agent (D)]

The resin composition for a sheet may contain a coupling agent (D). The coupling agent (D) can improve the wettability of the interface between the thermosetting resin (A) and the filler material (B).

The coupling agent (D) is not particularly limited, but one or two or more coupling agents selected from, for example, an epoxy silane coupling agent, a cationic silane coupling agent, an aminosilane coupling agent, a titanate-based coupling agent, and a silicone oil-type coupling agent are preferably used.

The content of the coupling agent (D) is not particularly limited, but is preferably 0.05% by mass or more, and more preferably 0.1% by mass or more with respect to 100% by mass of the filler material (B). Meanwhile, the content is preferably 3% by mass or less, and more preferably 2% by mass or less with respect to 100% by mass of the filler material (B).

[Phenoxy Resin (E)]

Furthermore, the resin composition for a sheet may contain a phenoxy resin (E). In a case where the phenoxy resin (E) is contained, the flex resistance of the heat dissipating sheet 205 can be improved.

In addition, in a case where the phenoxy resin (E) is contained, the elastic modulus of the heat dissipating sheet 205 can be reduced, and the stress relaxation force of the heat dissipating sheet 205 can be improved.

In addition, in a case where the phenoxy resin (E) is contained, the viscosity increases, and thus the fluidity is reduced and the occurrence of voids and the like can be suppressed. In addition, in a case where the heat dissipating sheet 205 is used in close contact with a metal member, the adhesion between the metal and the cured body of the resin composition for a sheet can be improved. Due to the synergistic effect of these factors, the insulation reliability of the power module 201 can be further increased.

Examples of the phenoxy resin (E) include a phenoxy resin having a bisphenol skeleton, a phenoxy resin having a naphthalene skeleton, a phenoxy resin having an anthracene skeleton, and a phenoxy resin having a biphenyl skeleton. In addition, it is also possible to use a phenoxy resin having a structure having a plurality of these skeletons.

The content of the phenoxy resin (E) is preferably, for example, 3% by mass or more and 10% by mass or less with respect to the total amount of the resin composition for a sheet.

[Other Components]

The resin composition for a sheet may further contain an antioxidant, a leveling agent, and the like as long as the effects of the present invention are not impaired.

<First Water Channel for Cooling 210>

The first water channel for cooling 210 extending horizontally in the drawing is provided above the power semiconductor chip 202 and the lead frame 207. The first water channel for cooling 210 is provided as a configuration in which the small-diameter resin pipe 200 to be described later is embedded in the resin sealing layer 209. A plurality of the small-diameter resin pipes 200 are provided according to required heat dissipation conditions. A coolant (for example, cooling water) circulates in the first water channel for cooling 210, and the heat generated by the power semiconductor chip 202 is thus dissipated to the outside.

<Small-Diameter Resin Pipe 200 (Resin Hollow Body)>

The small-diameter resin pipe 200 is a resin hollow body having a long linear pipe structure made of a thermosetting resin (A). In this embodiment, the configuration in which the small-diameter resin pipe 200 (resin hollow body) is applied to cooling of the power semiconductor chip 202 has been exemplified, but the resin pipe can also be applied to, for example, the cooling water channel 10 of the motor 100 of the second embodiment described above.

Examples of the thermosetting resin (A) include an epoxy resin, a cyanate resin, a polyimide resin, a benzoxazine resin, an unsaturated polyester resin, a phenol resin, a melamine resin, a silicone resin, a bismaleimide resin, a phenoxy resin, and an acrylic resin. As the thermosetting resin (A), one of the above kinds may be used alone, or two or more may be used in combination. An epoxy resin is preferable.

Examples of the epoxy resin include bisphenol-type epoxy resins such as a bisphenol A-type epoxy resin, a bisphenol F-type epoxy resin, a bisphenol E-type epoxy resin, a bisphenol S-type epoxy resin, a bisphenol M-type epoxy resin (4,4'-(1,3-phenylenediisopridiene)bisphenol epoxy resin), a bisphenol P-type epoxy resin (4,4'-(1,4-phenylenediisopridiene)bisphenol epoxy resin), and a bis-phenol Z-type epoxy resin (4,4'-cyclohexydiene bisphenol epoxy resin); novolac-type epoxy resins such as a phenol novolac-type epoxy resin, a cresol novolac-type epoxy resin, a trisphenol group methane-type novolac-type epoxy resin, a tetraphenol group ethane-type novolac-type epoxy resin, and a novolac-type epoxy resin having a condensed ring aromatic hydrocarbon structure; biphenyl-type epoxy resins; arylalkylene-type epoxy resins such as a xylylene-type epoxy resin and a biphenylaralkyl-type epoxy resin; naph-thalene-type epoxy resins such as a naphthylene ether-type epoxy resin, a naphthol-type epoxy resin, a naphthalenediol-type epoxy resin, a bifunctional or tetrafunctional epoxy-type naphthalene resin, a binaphthyl-type epoxy resin, and a naphthalene aralkyl-type epoxy resin; anthracene-type epoxy resins; phenoxy-type epoxy resins; dicyclopentadi-ene-type epoxy resins; norbornene-type epoxy resins; ada-mantane-type epoxy resins; and fluorene-type epoxy resins. One of the above kinds may be used alone, or two or more may be used in combination.

Among the epoxy resins, one or two or more kinds selected from the group consisting of bisphenol-type epoxy resins, novolac-type epoxy resins, biphenyl-type epoxy res-ins, arylalkylene-type epoxy resins, naphthalene-type epoxy resins, anthracene-type epoxy resins, and dicyclopentadi-ene-type epoxy resins are preferable from the viewpoint of further improving the heat resistance and the insulation reliability.

Examples of the phenol resin include novolac-type phenol resins such as a phenol novolac resin, a cresol novolac resin, and a bisphenol A novolac resin, and resol-type phenol resins. One of the above kinds may be used alone, or two or more may be used in combination.

Among the phenol resins, a phenol novolac resin is preferable.

The content of the thermosetting resin (A) is preferably 1% by mass or more, and more preferably 5% by mass or more with respect to the total amount of the resin compo-sition for a resin hollow body. Meanwhile, the content is preferably 30% by mass or less, and more preferably 20% by mass or less with respect to the total amount of the resin composition for a resin hollow body.

In a case where the content of the thermosetting resin (A) is equal to or more than the above lower limit, the handle-ability of the resin composition for a resin hollow body is improved, the small-diameter resin pipe 200 (resin hollow body) is easily formed, and the strength of the small-diameter resin pipe 200 is improved.

In a case where the content of the thermosetting resin (A) is equal to or less than the above upper limit, the linear expansion coefficient and the elastic modulus of the small-diameter resin pipe 200 are further improved, or the thermal conductive properties are further improved.

[Filler Material (B)]

In this embodiment, a filler material (B) is used from the viewpoint of improving the thermal conductive properties of the small-diameter resin pipe 200 and obtaining the strength.

As the filler material (B), a thermal conductive filler is preferable. More specific examples of the filler material (B) include silica, alumina, boron nitride, aluminum nitride, and silicon carbide from the viewpoint of balancing the thermal conductive properties with the electrical insulating proper-ties. One of the above kinds may be used alone, or two or more may be used in combination. Among these, alumina or boron nitride is preferable as the filler material (B).

The content of the filler material (B) is preferably 90% by mass or less, and more preferably 80% by mass or less with respect to the total amount of the resin composition for a resin hollow body. Meanwhile, the content is preferably 40% by mass or more, and more preferably 50% by mass or more with respect to the total amount of the resin compo-sition for a resin hollow body from the viewpoint of thermal conductive properties.

[Curing Agent (C)]

In a case where an epoxy resin or a phenol resin is used as the thermosetting resin (A) in the resin composition for a resin hollow body, a curing agent (C) is preferably further contained.

As the curing agent (C), one or more selected from a curing catalyst (C-1) and a phenol-based curing agents (C-2) can be used.

Examples of the curing catalyst (C-1) include organic metal salts such as zinc naphthenate, cobalt naphthenate, tin octylate, cobalt octylate, bisacetylacetonato cobalt (II), and trisacetylacetonato cobalt (III); tertiary amines such as tri-ethylamine, tributylamine, and 1,4-diazabicyclo[2.2.2]oc-tane; imidazoles such as 2-phenyl-4-methylimidazole, 2-ethyl-4-methylimidazole, 2,4-diethylimidazole, 2-phenyl-4-methyl-5-hydroxyimidazole, and 2-phenyl-4,5-dihy-droxymethylimidazole; organic phosphorous compounds such as triphenylphosphine, tri-p-tolylphosphine, tetraphe-nylphosphoniumtetraphenylborate, triphenylphosphinetri-phenylborane, and 1,2-bis-(diphenylphosphino)ethane; phe-nol compounds such as phenol, bisphenol A, and nonylphenol; organic acids such as an acetic acid, a benzoic acid, a salicylic acid, and a p-toluenesulfonic acid; and mixtures thereof. As the curing catalyst (C-1), one of the above kinds and derivatives thereof can be used alone, or two or more of the above kinds and derivatives thereof can be used in combination.

The content of the curing catalyst (C-1) is not particularly limited, but is preferably 0.001% by mass or more and 1% by mass or less with respect to the total amount of the resin composition for a resin hollow body.

In addition, examples of the phenol-based curing agent (C-2) include novolac-type phenol resins such as a phenol novolac resin, a cresol novolac resin, a trisphenol methane-type novolac resin, a naphthol novolac resin, and an ami-notriazine novolac resin; modified phenol resins such as a terpene-modified phenol resin and a dicyclopentadiene-modified phenol resin; aralkyl-type resins such as a phenol aralkyl resin having a phenylene skeleton and/or a biphe-nylene skeleton and a naphthol aralkyl resin having a phenylene skeleton and/or a biphenylene skeleton; bisphe-nol compounds such as bisphenol A and bisphenol F; and resol-type phenol resins, and one of the above kinds may be used alone, or two or more may be used in combination.

Among these, novolac-type phenol resins or resol-type phenol resins are preferable as the phenol-based curing agent (C-2) from the viewpoint of improving the glass transition temperature and reducing the coefficient of linear expansion.

The content of the phenol-based curing agent (C-2) is not particularly limited, but is preferably 1% by mass or more, and more preferably 5% by mass or more with respect to the total amount of the resin composition for a resin hollow body. Meanwhile, the content is preferably 30% by mass or less, and more preferably 15% by mass or less with respect to the total amount of the resin composition for a sheet.

[Coupling Agent (D)]

The resin composition for a resin hollow body may contain a coupling agent (D). The coupling agent (D) can improve the wettability of the interface between the thermosetting resin (A) and the filler material (B).

The coupling agent (D) is not particularly limited, but one or two or more coupling agents selected from, for example, an epoxy silane coupling agent, a cationic silane coupling agent, an aminosilane coupling agent, a titanate-based coupling agent, and a silicone oil-type coupling agent are preferably used.

The content of the coupling agent (D) is not particularly limited, but is preferably 0.05% by mass or more, and more preferably 0.1% by mass or more with respect to 100% by mass of the filler material (B). Meanwhile, the content is preferably 3% by mass or less, and more preferably 2% by mass or less with respect to 100% by mass of the filler material (B).

[Phenoxy Resin (E)]

Furthermore, the resin composition for a resin hollow body may contain a phenoxy resin (E). In a case where the phenoxy resin (E) is contained, the flex resistance of the small-diameter resin pipe 200 can be improved.

In addition, in a case where the phenoxy resin (E) is contained, the elastic modulus of the small-diameter resin pipe 200 can be reduced, and the stress relaxation force of the small-diameter resin pipe 200 can be improved.

In addition, in a case where the phenoxy resin (E) is contained, the viscosity increases, and thus the fluidity is reduced and the occurrence of voids and the like can be suppressed.

Examples of the phenoxy resin (E) include a phenoxy resin having a bisphenol skeleton, a phenoxy resin having a naphthalene skeleton, a phenoxy resin having an anthracene skeleton, and a phenoxy resin having a biphenyl skeleton. In addition, it is also possible to use a phenoxy resin having a structure having a plurality of these skeletons.

The content of the phenoxy resin (E) is preferably, for example, 3% by mass or more and 10% by mass or less with respect to the total amount of the resin composition for a resin hollow body.

[Other Components]

The resin composition for a resin hollow body may further contain an antioxidant, a leveling agent, and the like as long as the effects of the present invention are not impaired.

<Pipe Structure of Small-Diameter Resin Pipe 200>

The features of the pipe structure of the small-diameter resin pipe 200 are as follows.

The small-diameter resin pipe 200 is a cylindrical pipe in which an end portion 212 of an inner surface 211 is formed straight without a tapered shape. In this embodiment, the cylindrical pipe having a circular cross section has been exemplified, but a deformed pipe having an elliptical or polygonal cross section may be used.

An inner diameter D1 of the small-diameter resin pipe 200 is 1.8 mm or more and 3.5 mm or less. In a case where the small-diameter resin pipe 200 is a deformed pipe, the narrowest width of the inner diameter is set to D1. The lower limit of the inner diameter D1 is preferably 1.9 mm or more, and more preferably 2.0 mm or more. The upper limit is preferably 3.2 mm or less, and more preferably 3.0 mm or less.

An outer diameter D2 of the small-diameter resin pipe 200 is 2.0 mm or more and 4.5 mm or less. The outer diameter is preferably 2.1 mm or more, and more preferably 2.2 mm or more. The upper limit is preferably 4.2 mm or less, and more preferably 4.0 mm or less.

A thickness t $(=(D2-D1)/2)$ of the small-diameter resin pipe 200 is 0.10 mm or more and 1 mm or less. The lower limit of the thickness t is preferably 0.15 mm or more, and more preferably 0.20 mm or more. The upper limit is preferably 0.9 mm or less, and more preferably 0.8 mm or less.

A length L of the small-diameter resin pipe 200 is 60 mm or more and 250 mm or less. The lower limit of the length L is preferably 70 mm or more, and more preferably 80 mm or more. The upper limit is preferably 230 mm or less, and more preferably 200 mm or less.

A ratio L/D1 of the length L to the inner diameter D1 of the small-diameter resin pipe 200 is 20 or more and 125 or less.

The lower limit of the ratio L/D1 is preferably 25 or more, and more preferably 30 or more. The upper limit is preferably 120 or less, and more preferably 100 or less. For example, in a case where the length L is 60 mm and the inner diameter D1 is 3 mm, the ratio L/D1 is 20. In a case where the length L is 250 mm and the inner diameter D1 is 2 mm, the ratio L/D1 is 125.

<Cu Base Plate 206>

The Cu base plate 206 is a kind of heat dissipating member, and has a plate-like base portion made of copper and a second cooling water channel 220 provided in a lower region of the base portion in the drawing.

Instead of the Cu base plate 206, for example, an aluminum base plate may be employed as the heat dissipating member. In addition, the heat dissipating member is not limited to a general heat dissipating member as long as it has a function of acquiring the heat generated by the power semiconductor chip 202 via the Cu circuit 204 and releasing the heat to other places, and the heat dissipating member may be a part of another configuration (for example, housing).

<Second Cooling Water Channel 220>

As in the case of the first water channel for cooling 210, the second cooling water channel 220 has a function of discharging the heat of the Cu base plate 206 to the outside with a coolant circulating therein. The second cooling water channel 220 may be formed by hollowing out the Cu base plate 206 so that all the inner wall surfaces thereof may be configured as a part of the Cu base plate 206. Alternatively, the second cooling water channel 220 may be configured by forming a pipe arrangement structure in the Cu base plate 206, placing the same resin hollow body as the small-diameter resin pipe 200 therein, and filling the peripheral places with a resin.

<Lead Frame 207>

The lead frame 207, supporting and fixing the power semiconductor chip 202 and providing electrical connection with external wiring, is a component produced by pressing or etching a thin plate of a metal material such as copper or iron.

<Resin Sealing Layer 209>

The resin sealing layer 209 is, for example, a mold resin, and integrally seals the power semiconductor chip 202, the sintering layer 203, the Cu circuit 204, the heat dissipating sheet 205, the Cu base plate 206, the lead frame 207, and the first water channel for cooling 210 therein.

Other than the mold resin, silicone gel or the like may be used as the resin sealing layer 209. An integral sealing configuration with a mold resin will be described below.

In this sealing, a part of the lead frame 207 is sealed, and the other part which is not sealed is connected to an external device. In addition, regarding the Cu base plate 206, the upper surface and side surfaces of the Cu base plate 206 are covered and sealed with the resin sealing layer 209. The lower surface of the Cu base plate 206 and the second cooling water channel 220 are not covered with the resin sealing layer 209. That is, the resin sealing layer 209 covers and seals the power semiconductor chip 202 so as to cover all or part of the side surface in a thickness direction of the base portion 5A of the Cu base plate 206. Here, the configuration in which the side surface of the base portion 5A of the Cu base plate 206 is entirely covered with the resin sealing layer 209 has been exemplified.

[Components of Resin Sealing Layer 209 (Mold Resin)]

The mold resin of the resin sealing layer 209 is a cured body of a thermosetting composition (C) containing a thermosetting resin (A) and an inorganic filling material (B). The thermosetting composition (C) contains a curing accelerator (D).

[Curing Accelerator (D)]

The curing accelerator (D) of this embodiment has strong activity. Accordingly, it realizes curing at low temperatures. However, in a case where the curing accelerator (D) is used as it is without any special measures, the reaction proceeds during storage, and the storage properties deteriorate.

Examples of the curing accelerator (D) include phosphorus atom-containing compounds such as organic phosphines, tetrasubstituted phosphonium compounds, phosphobetaine compounds, adducts of phosphine compounds and quinone compounds, and adducts of phosphonium compounds and silane compounds; amidine-based compounds such as 1,8-diazabicyclo(5,4,0)undecene-7 and imidazole; tertiary amines such as benzyldimethylamine; and nitrogen atom-containing compounds such as amidinium salts and ammonium salts.

Among these, an imidazole-based curing accelerator or a phosphorus-based curing accelerator is preferable as the curing accelerator (D). As the imidazole-based curing accelerator, for example, an imidazole compound of an amidine-based compound is more preferably included. Examples of the imidazole compound include, but are not limited to, 2-methylimidazole, 2-phenylimidazole, imidazole-2-carbaldehyde, 5-azabenzimidazole, and 4-azabenzimidazole. Among these, 2-methylimidazole is preferably used.

The content of the curing accelerator (D) in the sealing resin composition is not particularly limited, but for example, preferably 0.1% by mass or more and 5% by mass or less, and more preferably 0.2% by mass or more and 4% by mass or less with respect to the entire sealing resin composition.

In a case where the content of the curing accelerator (D) is equal to or more than the above lower limit, it becomes easier to appropriately cure the sealing resin composition. Meanwhile, in a case where the content of the curing accelerator (D) is equal to or less than the above upper limit, the molten state is prolonged, and the low-viscosity state can be prolonged. As a result, sealing at low temperatures is easily realized.

[Thermosetting Resin (A)]

Examples of the thermosetting resin (A) include a phenol resin, an epoxy resin, an unsaturated polyester resin, a melamine resin, and polyurethane. One of the above kinds may be used alone, or two or more may be used in combination. Among these, at least one of a phenol resin and an epoxy resin is preferably contained, and an epoxy resin is more preferably contained.

As the epoxy resin, monomers, oligomers, and polymers having two or more epoxy groups in one molecule can be used, and the molecular weight and molecular structure thereof are not particularly limited.

Specific examples of the epoxy resin include bisphenol-type epoxy resins such as a biphenyl-type epoxy resin, a bisphenol A-type epoxy resin, a bisphenol F-type epoxy resin, and a tetramethylbisphenol F-type epoxy resin, crystalline epoxy resins such as a stilbene-type epoxy resin and a hydroquinone-type epoxy resin; novolac-type epoxy resins such as a cresol novolac-type epoxy resin, a phenol novolac-type epoxy resin, and a naphthol novolac-type epoxy resin; aralkyl-type epoxy resins such as a phenylene skeleton-containing phenol aralkyl-type epoxy resin, a biphenylene skeleton-containing phenol aralkyl-type epoxy resin, a phenylene skeleton-containing naphthol aralkyl-type epoxy resin, and an alkoxynaphthalene skeleton-containing phenol aralkyl epoxy resin; trifunctional epoxy resins such as a triphenolmethane-type epoxy resin and an alkyl-modified triphenolmethane-type epoxy resin; modified phenol-type epoxy resins such as a dicyclopentadiene-modified phenol-type epoxy resin and a terpene-modified phenol-type epoxy resin; and heterocyclic ring-containing epoxy resins such as a triazine nucleus-containing epoxy resin. One of the above kinds may be used alone, or two or more may be used in combination. Among these, at least one of an aralkyl-type epoxy resin and a naphthyl ether-type epoxy resin is more preferably used from the viewpoint of improving the balance between the reliability of the aluminum electrolytic capacitor and the moldability.

It is suitable that the ICI viscosity of the thermosetting resin (A) at 150° C. is appropriately set according to the content of the inorganic filling material (B), and for example, the upper limit is preferably 60 poise or less, more preferably 50 poise or less, and even more preferably 40 poise or less. Accordingly, the fluidity of the resin composition for sealing is improved, and sealing at low temperatures is easily realized.

Meanwhile, the lower limit of the ICI viscosity of the thermosetting resin (A) at 150° C. is not particularly limited, but may be, for example, 0.01 poise or more.

1 poise is 0.1 Pa·s.

The content of the thermosetting resin (A) is not particularly limited, but for example, preferably 1% by mass or more and 50% by mass or less, more preferably 2% by mass or more and 30% by mass or less, and even more preferably 5% by mass or more and 20% by mass or less with respect to the entire sealing resin composition.

In a case where the content of the thermosetting resin (A) is equal to or more than the above lower limit, the fluidity of the sealing resin composition and the moldability can be more effectively improved. In addition, in a case where the content of the thermosetting resin (A) is equal to or less than the above upper limit, the reliability of the aluminum electrolytic capacitor can be more effectively improved.

[Inorganic Filling Material (B)]

Examples of the inorganic filling material (B) include silica, alumina, kaolin, talc, clay, mica, rock wool, wollastonite, glass powder, glass flakes, glass beads, glass fibers, silicon carbide, silicon nitride, aluminum nitride, carbon black, graphite, titanium dioxide, calcium carbonate, calcium sulfate, barium carbonate, magnesium carbonate, magnesium sulfate, barium sulfate, cellulose, aramid, and wood. One of the above kinds may be used alone, or two or more may be used in combination.

Examples of the silica include crystalline silica (crushed crystalline silica), fused silica (crushed amorphous silica and spherical amorphous silica), and liquid sealing silica (spherical amorphous silica for liquid sealing). Among these, fused spherical silica is preferable from the viewpoint of easily realizing sealing at low temperatures and low pressures.

The average particle diameter of the inorganic filler material (B) is not particularly limited, but typically 1 to 100 μm, preferably 1 to 50 μm, and more preferably 1 to 20 μm. In a case where the average particle diameter is appropriately set, it is considered that the coating of the shell containing the molten mixture is more uniformly applied in a granulation step to be described later. In addition, when the finally obtained core-shell particles are used as a semiconductor sealing material, the filling properties around the semiconductor element in a mold cavity can be increased.

The volume-based particle size distribution of the inorganic filling material (B) can be measured with a commercially available laser particle size distribution meter (for example, SALD-7000 manufactured by Shimadzu Corporation).

The content of the inorganic filling material (B) is not particularly limited, but for example, preferably 50% by mass or more and 95% by mass or less, more preferably 60% by mass or more and 95% by mass or less, and even more preferably 65% by mass or more and 85% by mass or less with respect to the entire sealing resin composition.

In a case where the content of the inorganic filling material (B) is equal to or more than the above lower limit, the reliability of the aluminum electrolytic capacitor sealed with the sealing resin composition can be effectively improved. In addition, in a case where the content of the inorganic filling material (B) is equal to or less than the above upper limit, the sealing resin composition has good fluidity, and the moldability can be more effectively improved.

The sealing resin composition of this embodiment may contain the following components in addition to the above components.

[Curing Agent (C)]

The sealing resin composition may contain a curing agent (C). The curing agent (C) is not particularly limited as long as it reacts with and cures the thermosetting resin (A), and examples thereof include linear aliphatic diamines having 2 to 20 carbon atoms such as ethylenediamine, trimethylenediamine, tetramethylenediamine, and hexamethylenediamine, amines such as metaphenylenediamine, paraphenylenediamine, paraxylenediamine, 4,4'-diaminodiphenylmethane, 4,4'-diaminodiphenylpropane, 4,4'-diaminodiphenylether, 4,4'-diaminodiphenylsulfone, 4,4'-diaminodicyclohexane, bis(4-aminophenyl)phenylmethane, 1,5-diaminonaphthalene, metaxylenediamine, paraxylenediamine, 1,1-bis(4-aminophenyl)cyclohexane, and dicyanodiamide; resol-type phenol resins such as an aniline-modified resol resin and a dimethyl ether resol resin; novolac-type phenol resins such as a phenol novolac resin, a cresol novolac resin, a tert-butylphenol novolac resin, and a nonylphenol novolac resin; phenol aralkyl resins such as a phenylene skeleton-containing phenol aralkyl resin and a biphenylene skeleton-containing phenol aralkyl resin; phenol resins having a condensed polycyclic structure such as a naphthalene skeleton and an anthracene skeleton; polyoxystyrenes such as polyparaoxystyrene; acid anhydrides, including alicyclic acid anhydrides such as hexahydrophthalic anhydride (HHPA) and methyltetrahydrophthalic anhydride (MTHPA), and aromatic acid anhydrides such as trimellitic anhydride (TMA), pyromellitic anhydride (PMDA), and benzophenonetetracarboxylic acid (BTDA); polymercaptan compounds such as polysulfide, thioester, and thioether; isocyanate compounds such as an isocyanate prepolymer and a blocked isocyanate; and organic acids such as a carboxylic acid-containing polyester resin. One of the above kinds may be used alone, or two or more may be used in combination. Among these, at least one of a novolac-type phenol resin and a phenol aralkyl resin is more preferably used from the viewpoint of realizing sealing of the sealing resin composition at low temperatures and low pressures.

The content of the curing agent (C) in the sealing resin composition is not particularly limited, but for example, preferably 1% by mass or more and 12% by mass or less, and more preferably 3% by mass or more and 10% by mass or less with respect to the entire sealing resin composition.

In a case where the content of the curing agent (C) is equal to or more than the above lower limit, it becomes easier to appropriately cure the sealing resin composition. Meanwhile, in a case where the content of the curing agent (C) is equal to or less than the above upper limit, it becomes easier to maintain appropriate fluidity and realize sealing at low temperatures and low pressures.

[Coupling Agent (E)]

The sealing resin composition may contain, for example, a coupling agent (E). Examples of the coupling agent (E) include various silane-based compounds such as epoxysilane, mercaptosilane, aminosilane, alkylsilane, ureidosilane, and vinylsilane, and known coupling agents such as titanium-based compounds, aluminum chelates, and aluminum-zirconium-based compounds.

More specific examples thereof include silane-based coupling agents such as hydrolysates of vinyltrichlorosilane, vinyltrimethoxysilane, vinyltriethoxysilane, vinyltris(β-methoxyethoxy)silane, γ-methacryloxypropyltrimethoxysilane, β-(3,4-epoxycyclohexyl)ethyltrimethoxysilane, γ-glycidoxypropyltrimethoxysilane, γ-glycidoxypropyltriethoxysilane, γ-glycidoxypropylmethyldimethoxysilane, γ-methacryloxypropylmethyldiethoxysilane, γ-methacryloxypropyltriethoxysilane, vinyltriacetoxysilane, γ-mercaptopropyltrimethoxysilane, γ-aminopropyltriethoxysilane, γ-anilinopropyltrimethoxysilane, γ-anilinopropylmethyldimethoxysilane, γ-[bis(β-hydroxyethyl)]aminopropyltriethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, N-phenyl-γ-aminopropyltrimethoxysilane, γ-(β-aminoethyl)aminopropyldimethoxymethylsilane, N-(trimethoxysilylpropyl)ethylenediamine, N-(dimethoxymethylsilylisopropyl)ethylenediamine, methyltrimethoxysilane, dimethyldimethoxysilane, methyltriethoxysilane, N-β-(N-vinylbenzylaminoethyl)-γ-aminopropyltrimethoxysilane, γ-chloropropyltrimethoxysilane, hexamethyldisilane, vinyltrimethoxysilane, γ-mercaptopropylmethyldimethoxysilane, 3-isocyanatepropyltriethoxysilane, 3-acryloxypropyltrimethoxysilane, and 3-triethoxysilyl-N-(1,3-dimethylbutylidene)propylamine; and titanate-based coupling agents such as isopropyl triisostearoyl titanate, isopropyl tris(dioctylpyrophosphate)titanate, isopropyl tri(N-aminoethyl-aminoethyl)titanate, tetraoctyl bis(ditridecyl phosphite)titanate, tetra(2,2-diallyloxymethyl-1-butyl)bis(ditridecyl)phosphite titanate, bis(dioctylpyrophosphate)oxyacetate titanate, bis (dioctylpyrophosphate)ethylene titanate, isopropyl trioctanoyl titanate, isopropyl dimethacryl isostearoyl titanate, isopropyl tridodecyl benzenesulfonyl titanate, isopropyl isostearoyl diacryl titanate, isopropyl tri(dioctylphosphate) titanate, isopropyl tricumyl phenyl titanate, and tetraisopropyl bis(dioctyl phosphite)titanate. One of the above kinds may be used alone, or two or more may be used in combination.

The content of the coupling agent (E) in the sealing resin composition is not particularly limited, but for example, preferably 0.05% by mass or more and 3% by mass or less, and more preferably 0.1% by mass or more and 2% by mass or less with respect to the entire sealing resin composition. In a case where the content of the coupling agent (E) is equal to or more than the above lower limit, the dispersibility of the inorganic filling material (B) in the sealing resin composition can be improved. In addition, in a case where the content of the coupling agent (E) is equal to or less than the above upper limit, the sealing resin composition has good fluidity, and the moldability can be improved.

The sealing resin composition of this embodiment may further contain, for example, various additives such as a coloring agent such as carbon black; a release agent such as natural wax, synthetic wax, higher fatty acids or metal salts thereof, paraffin, and polyethylene oxide; an ion scavenger such as hydrotalcite; a low stress agent such as silicone oil and silicone rubber; a flame retardant such as aluminum hydroxide; and an antioxidant, in addition to the above components.

<Method of Manufacturing Small-Diameter Resin Pipe 200>

Figure 14:
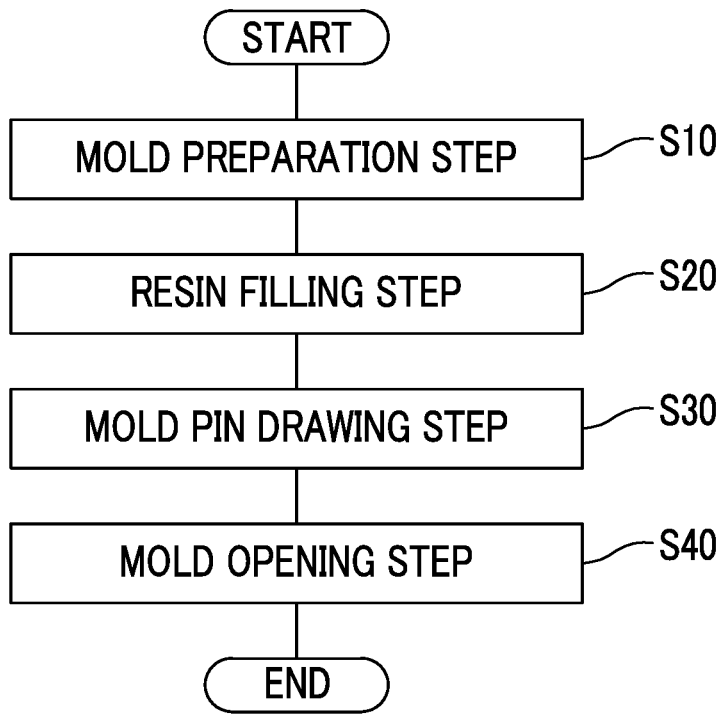
FIG. 14 is a flowchart showing a method of manufacturing a small-diameter resin pipe according to the fourth embodiment.

A method of manufacturing the small-diameter resin pipe 200 will be described with reference to the flowchart of FIG. 14.

(Mold Preparation Step S10)

As a mold for manufacturing a molded product of the small-diameter resin pipe 200, a split mold having a recessed portion formed on a mating surface is prepared. The recessed portion has a columnar shape, and corresponds to the shape of the outer peripheral surface of the small-diameter resin pipe 200. For example, in a case where the mold is composed of two split molds, the recessed portion of each split mold corresponds to the half circumference of the outer shape of the small-diameter resin pipe 200.

A long linear mold pin (core pin) is placed in the recessed portion so as to extend in an axial direction (pipe length direction). The outer peripheral surface of the mold pin corresponds to the inner peripheral surface of the small-diameter resin pipe 200. Both ends of the core pin are supported so that the mold pin does not shift during resin filling. After the mold pin is placed and the mold is closed, the process proceeds to the next resin filling step S20.

(Resin Filling Step S20)

The above-described thermosetting resin (for example, epoxy resin) is applied at a high pressure into the gap (cavity) formed by the recessed portion and the mold pin (core pin). In this case, the filling pressure is preferably 10 MPa or more and 12 MPa or less. In a case where the thermosetting resin is applied at such a filling pressure, the flow of the resin can be made smooth, and filling trouble such as short shot can be suppressed.

(Mold Pin Drawing Step S30)

The applied thermosetting resin is cured, and then the mold pin is drawn out from the small-diameter resin pipe 200 using a predetermined jig. The drawing force may be, for example, 60 kgw to 130 kgw. In a case where the small-diameter resin pipe 200 has a small thickness, the drawing force is reduced to suppress the occurrence of buckling, surface damages, and the like during mold release.

(Mold Opening Step S40)

The small-diameter resin pipe 200 is released from the mold pin (S30), and then the mold is opened to take out the small-diameter resin pipe 200 from the mold.

According to the method of manufacturing the small-diameter resin pipe 200 described above, since the resin flows smoothly during filling and sticking to the surface of the recessed portion of the mold or the pin surface of the mold pin can be suppressed, mold release, especially drawing of the small-diameter resin pipe 200 from the mold pin can be smoothly performed. In other words, even in a case where the small-diameter resin pipe 200 has no taper for drawing (demold taper), the small-diameter resin pipe 200 can be drawn out without being broken. That is, it is possible to manufacture a linear small-diameter resin pipe 200 (resin hollow body) with no demold taper.

<Method of Manufacturing Power Module 201>

A set in which the power semiconductor chip 202, the sintering layer 203, the Cu circuit 204, the heat dissipating sheet 205, the Cu base plate 206 (including the second cooling water channel 220), and the lead frame 207 are fixed, and the small-diameter resin pipe 200 manufactured by the above-described manufacturing method are placed in a predetermined mold, and sealed with the resin sealing layer 209, and thus the power module 201 is manufactured.

Summary of Features of Embodiment

The features of this embodiment are summarized as follows.

(1) The small-diameter resin pipe 200 is a resin hollow body having a long linear pipe structure made of a thermosetting resin, in which a ratio L/D1 of a length L to an inner diameter D1 of the pipe structure (that is, small-diameter resin pipe 200) is 20 or more and 125 or less.

In molding of a resin hollow body having a long linear pipe structure using a thermosetting resin, in a case where the ratio L/D1 of the length L to the inner diameter D1 is within the above range, a small-diameter resin pipe 200 having no problems in quality can be molded by adjusting the material of the thermosetting resin and the molding pressure.

Since the small-diameter resin pipe 200 is made of a thermosetting resin, application to products expected to be used in high-temperature regions is possible.

(2) In the small-diameter resin pipe 200, an end portion 102 of an inner surface of the pipe structure is formed straight without a tapered shape.

In a case where the ratio L/D1 of the length L to the inner diameter D1 is within the above range as described above, the inner surface of the pipe can be formed straight without a tapered shape by adjusting the material of the thermosetting resin and the molding pressure.

(3) In the small-diameter resin pipe 200, the thermosetting resin consists of an epoxy resin.

In particular, with the use of a high thermal conductive epoxy resin, utilization for the first water channel for cooling 210 of the power module 201, cooling water channels of motors, or the like is possible, and a structure with excellent insulation performance and thermal efficiency (thermal conductive properties) can be realized.

(4) In the small-diameter resin pipe 200, the inner diameter D1 of the pipe structure is 1.8 mm or more and 3.5 mm or less.

Since the resin hollow body with a small diameter in which the inner diameter D1 is within the above range, that is, the small-diameter resin pipe 200 can be molded from the thermosetting resin, various products having a pipe shape with a small diameter as a resin hollow body can be realized.

(5) In the small-diameter resin pipe 200, a thickness t of the pipe structure is 0.10 mm or more and 1 mm or less.

Since the resin hollow body with a small diameter and a small thickness in which the thickness t is within the above range, that is, the small-diameter resin pipe 200 can be molded from the thermosetting resin, various products having a pipe shape with a small diameter and a small thickness as a resin hollow body can be realized.

(6) In the small-diameter resin pipe 200, an outer diameter D2 of the pipe structure is 2.0 mm or more and 4.5 mm or less.

Since the resin hollow body with a small diameter in which the outer diameter D2 is within the above range, that is, the small-diameter resin pipe 200 can be molded from the thermosetting resin, various products having a pipe shape with a small inner diameter D1 and a small outer diameter D2 as a resin hollow body can be realized.

(7) In the small-diameter resin pipe 200, a module (here, power module 201) has the above-described resin hollow body formed integrally therewith.

Application to various modules corresponding to various shapes based on the pipe shape such as the small-diameter resin pipe 200 is facilitated.

(8) In the small-diameter resin pipe 200, the resin hollow body is provided as a water channel for cooling (first water channel for cooling 210). In modules such as the power module 201 and motors, a cooling structure (water channel structure) with excellent insulation performance and thermal efficiency (thermal conductive properties) can be realized.

(9) A method of manufacturing a resin hollow body (small-diameter resin pipe 200) having a long linear pipe structure, having:

a resin filling step (S20) of filling a mold for molding having a long linear mold pin having an outer peripheral surface corresponding to an inner peripheral surface of the pipe structure with a thermosetting resin, and a mold pin drawing step (S30) of drawing out the mold pin, in which a ratio L/D1 of a length L to an inner diameter D1 of the pipe structure is 20 or more and 125 or less.

Since the resin hollow body can be manufactured using a mold (molding mold) having a mold pin, productivity can be greatly improved compared to a manufacturing method in which a sacrificial material is put in a structure corresponding to the inner-diameter portion of the pipe and removed after molding.

(10) In the method of manufacturing the small-diameter resin pipe 200, the mold pin has no tapered shape for drawing.

In a case where the ratio L/D1 of the length L to the inner diameter D1 is within the above range as described above, the inner surface of the pipe can be formed straight without a tapered shape by adjusting the material of the thermosetting resin and the molding pressure.

In a case where a drawing force is, for example, 60 to 130 kgw, mold release can be realized while avoiding molding defects such as resin cracks even in a structure without a tapered shape.

(11) In the method of manufacturing the small-diameter resin pipe 200, the thermosetting resin consists of an epoxy resin.

In particular, with the use of a high thermal conductive epoxy resin, utilization for the first water channel for cooling 210 of the power module 201, cooling water channels of motors, or the like is possible, and a structure with excellent insulation performance and thermal efficiency (thermal conductive properties) can be realized.

(12) In the method of manufacturing the small-diameter resin pipe 200, the inner diameter D1 of the pipe structure is 1.8 mm or more and 3.5 mm or less.

Since the resin hollow body with a small diameter in which the inner diameter D1 is within the above range, that is, the small-diameter resin pipe 200 can be molded from the thermosetting resin, various products having a pipe shape with a small diameter as a resin hollow body can be realized.

(13) In the method of manufacturing the small-diameter resin pipe 200, a thickness t of the pipe structure is 0.10 mm or more and 1 mm or less.

Since the resin hollow body with a small diameter and a small thickness in which the thickness t is within the above range, that is, the small-diameter resin pipe 200 can be molded from the thermosetting resin, various products having a pipe shape with a small diameter and a small thickness as a resin hollow body can be realized.

(14) In the method of manufacturing the small-diameter resin pipe 200, an outer diameter D2 of the pipe structure is 2.0 mm or more and 4.5 mm or less.

Since the resin hollow body with a small diameter in which the outer diameter D2 is within the above range, that is, the small-diameter resin pipe 200 can be molded from the thermosetting resin, various products having a pipe shape with a small inner diameter D1 and a small outer diameter D2 as a resin hollow body can be realized.

(15) In the method of manufacturing the small-diameter resin pipe 200, a filling pressure in a case where the thermosetting resin is applied into the mold for molding is 10 MPa or more and 12 MPa or less.

In a case where the thermosetting resin is applied at a filling pressure controlled within the above range, the flow of the resin during filling can be made smooth, and filling trouble such as short shot can be suppressed.

(16) A method of manufacturing a module (power module 201) having a resin hollow body using the method of manufacturing a resin hollow body (small-diameter resin pipe 200).

Application to various modules corresponding to various shapes based on the pipe shape such as the small-diameter resin pipe 200 is facilitated.

(17) In the method of manufacturing the power module 201, the resin hollow body is manufactured as a water channel for cooling (first water channel for cooling 210).

Although the embodiments of the present invention have been described above with reference to the drawings, these are merely examples of the present invention, and various configurations other than those described above can also be adopted.

EXAMPLES

The fourth embodiment of the present invention will be described in detail based on examples. The present invention is not limited to the examples.

Table 1 shows blending examples (wt %) of thermosetting resins used for molded products (Examples 1 to 6) in which a resin pipe (resin hollow body) corresponding to the small-diameter resin pipe 200 of the fourth embodiment described above is molded from the thermosetting resin. In Examples 1 to 3, a 3 W high thermal conductive epoxy material (silica based) is used, and in Examples 4 to 6, a 5 W high thermal conductive epoxy material (alumina based) is used. Table 2 shows evaluation results of Examples 1 to 6.

The manufacturing conditions for the resin pipes (resin hollow bodies) of Examples 1 to 6 are as follows.

Molding Method: transfer molding
Mold Temperature: 170° C.
Tablet Diameter: φ30 mm
Plunger Diameter: φ35 mm
Tablet Preheating Temperature: 90° C.
Material Injection Pressure: 8 MPa
Material Injection Time: 8 seconds
Curing Time: 180 seconds In Examples 1 and 4, the filling properties of the resin in the resin filling step was good, and no pin breakage occurred in the mold pin drawing step. It was possible to confirm that mold release is possible with a drawing force of 130 kg or less.

In Examples 2 and 5, the filling properties of the resin in the resin filling step was good, and no pin breakage or molding defects occurred in the mold pin drawing step. It was possible to confirm that mold release is possible with a drawing force of 60 kg or less.

In Examples 3 and 6, the filling properties of the resin in the resin filling step was good, and no pin breakage occurred in the mold pin drawing step. It was possible to confirm that mold release is possible with a drawing force of 60 kg or less. However, buckling occurred during mold release, which is considered to be due to the small thickness.

TABLE 1

| | | Examples 1 to 3 3 W High Thermal Conductive Epoxy Material | Examples 4 to 6 5 W High Thermal Conductive Epoxy Material |
|---|---|---|---|
| Inorganic Filler Material | Alumina | 75 | |
| | Silica | 15 | 90 |
| Resin | Epoxy Resin | 5 | 5 |
| | Curing Agent | 2 | 2 |
| | Others | 3 | 3 |
| | Total | 100 | 100 | wt%

TABLE 2

| | Molded Product | | | | | | Evaluation | |
|---|---|---|---|---|---|---|---|---|
| | Thermal Conductive | Drawing Length (total length (L)) | Outer Diameter (D2) | Inner Diameter (D1) | Thickness (t) | L/D1 | Filling Properties | Drawing |
| Example 1 | 3 W | 205 mm | φ3.9 mm | φ2.0 mm | 0.95 mm | 102.5 | ◎ | ◎ |
| Example 2 | | | | φ2.9 mm | 0.50 mm | 70.7 | ◎ | ◎ |
| Example 3 | | | | φ3.3 mm | 0.30 mm | 62.1 | ◎ | ○ |
| Example 4 | 5 W | | | φ2.0 mm | 0.95 mm | 102.5 | ◎ | ◎ |
| Example 5 | | | | φ2.9 mm | 0.50 mm | 70.7 | ◎ | ◎ |
| Example 6 | | | | φ3.3 mm | 0.30 mm | 62.1 | ◎ | ○ |

The present application claims priority based on Japanese Patent Application No. 2020-203912 filed on Dec. 9, 2020 and Japanese Patent Application No. 2021-066387 filed on Apr. 9, 2021, the disclosure of which is incorporated herein in its entirety.

REFERENCE SIGNS LIST

100 motor
1 case
2 rotor
4 stator
5 permanent magnet
6 yoke portion
7 tooth portion
8 slot
9 coil
10 cooling water channel
20, 20A, 20B, 20C, 20D liner member
21 coil accommodation portion
50 resin layer
51 inner resin layer
52 outer resin layer
55 resin layer surface
55a, 55b end portion
65 resin sealing portion
71 tooth tip
72, 73 wall surface
75a upper surface
75b lower surface
100 motor
200 resin pipe
201 power module
202 power semiconductor chip
203 sintering layer
204 Cu circuit
205 heat dissipating sheet
206 Cu base plate
210 first water channel for cooling
220 second water channel for cooling
211 inner surface
212 end portion

The invention claimed is:
1. A stator comprising:
a stator core having a plurality of tooth portions;
a slot provided between the tooth portions and accommodating a coil; and
the coil accommodated in the slot,
wherein the stator has a resin layer provided on an inner surface of the slot and made of an insulating resin composition, wherein a wall surface of the resin layer on an inner side of the slot is provided in parallel with a rotating shaft direction, wherein the resin composition contains a thermosetting resin, wherein the thermosetting resin has a glass transition temperature Tg of 120° C. or higher, and wherein the resin layer has a thermal conductivity of 2 W/(m·K) or more.

2. The stator according to claim 1, wherein the resin composition contains wax as a release agent.

3. The stator according to claim 1, wherein the resin composition contains a filler as a filler material.

4. The stator according to claim 3, wherein the resin composition has a filler content of 60% by volume or more with respect to a total amount of the resin composition.

5. The stator according to claim 1, wherein the resin layer has a thickness of 50 μm or more and 500 μm or less.

6. The stator according to claim 1, wherein the thermosetting resin is an epoxy resin.

7. The stator according to claim 1, wherein the coil has a resin cover layer in which a coil surface is covered with a resin.

8. A stator comprising:

a stator core having a plurality of tooth portions;

a slot provided between the tooth portions and accommodating a coil; and the coil accommodated in the slot, wherein the stator has a resin layer provided on an inner surface of the slot and made of an insulating resin composition, wherein a wall surface of the resin layer on an inner side of the slot is provided in parallel with a rotating shaft direction, wherein the resin composition contains a thermosetting resin, wherein the thermosetting resin has a glass transition temperature Tg of 120° C. or higher, wherein the resin layer has a thermal conductivity of 0.5 W/(m·K) or more, wherein the stator has a resin liner member accommodating the coil, wherein the liner member is a separate member from the coil, and wherein the coil that is accommodated in the slot is in a state of being accommodated in the liner member.

9. A rotating electric machine comprising:

the stator according to claim 1.

10. A method of manufacturing a stator used for a rotating electric machine, having a stator core having a plurality of tooth portions, a slot provided between the tooth portions and accommodating a coil, and the coil accommodated in the slot, comprising:

a resin layer forming step of forming a resin layer made of an insulating resin composition on an inner surface of the slot; and a coil placing step of placing the coil in the slot provided with the resin layer, wherein a wall surface of the resin layer on an inner side of the slot is provided in parallel with a rotating shaft direction of the rotating electric machine, wherein the resin composition contains a thermosetting resin, wherein the thermosetting resin has a glass transition temperature Tg of 120° C. or higher, and wherein the resin layer has a thermal conductivity of 2 W/(m·K) or more.

* * * * *